United States Patent
Tabata et al.

(10) Patent No.: US 7,562,650 B2
(45) Date of Patent: Jul. 21, 2009

(54) START-UP CONTROL APPARATUS FOR AN INTERNAL COMBUSTION ENGINE

(75) Inventors: Mitsuhiro Tabata, Suntou-gun (JP); Kenji Kataoka, Susono (JP); Makoto Nakamura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 176 days.

(21) Appl. No.: 11/662,953

(22) PCT Filed: May 13, 2005

(86) PCT No.: PCT/JP2005/009201

§ 371 (c)(1),
(2), (4) Date: Mar. 15, 2007

(87) PCT Pub. No.: WO2006/120760

PCT Pub. Date: Nov. 16, 2006

(65) Prior Publication Data

US 2008/0103683 A1    May 1, 2008

(51) Int. Cl.
*F02M 1/16* (2006.01)
(52) U.S. Cl. ............... 123/491; 123/406.53; 123/179.4; 701/112; 701/113
(58) Field of Classification Search ............... 123/491, 123/406.53, 406.54, 179.4, 179.5; 701/112–113
See application file for complete search history.

(56) References Cited

U.S. PATENT DOCUMENTS

| | | | |
|---|---|---|---|
| 6,328,007 | B1 | 12/2001 | Hirasawa et al. |
| 7,011,063 | B2 * | 3/2006 | Condemine et al. ...... 123/179.4 |
| 7,269,499 | B2 * | 9/2007 | Murakami et al. .......... 701/112 |
| 7,377,248 | B2 * | 5/2008 | Hokuto .................... 123/179.4 |
| 2002/0078924 | A1 | 6/2002 | Yagi |
| 2008/0091328 | A1 * | 4/2008 | Tabata et al. ................. 701/102 |

FOREIGN PATENT DOCUMENTS

| EP | 1881 188 | * | 1/2008 |
|---|---|---|---|
| JP | U 60-128975 | | 8/1985 |

(Continued)

*Primary Examiner*—Hai H Huynh
(74) *Attorney, Agent, or Firm*—Oliff & Berridge, PLC

(57) ABSTRACT

The present invention is directed to a start-up control apparatus for an internal combustion engine that can further improve the start-up characteristics of an internal combustion engine. An ECU is provided that corrects a position at which the crankshaft stops or a position at which the crankshaft is predicted to stop based on a rotation state of the crankshaft immediately before stopping; switches an actuation timing of the fuel injection valve of the stopped intake-stroke cylinder, which is predicted to be in a intake stroke based on a position at which the crankshaft stops, based on the position at which the crankshaft is predicted to stop; during engine start-up, switches an ignition timing that actuates the spark plugs based on the position at which the crankshaft stops; predicts the amount of air that is drawn into a cylinder during a predetermined interval after engine start-up, based on the engine speed, the position at which the crankshaft stops, volume in a intake passage, and the number of times that the intake stroke has been carried out; and calculates the fuel injection amount for the cylinder based on the predicted amount of air.

10 Claims, 11 Drawing Sheets

FOREIGN PATENT DOCUMENTS

| | | |
|---|---|---|
| JP | A 2-271073 | 11/1990 |
| JP | A 8-312433 | 11/1996 |
| JP | A 11-107823 | 4/1999 |
| JP | A 2000-265879 | 9/2000 |
| JP | A 2001-50091 | 2/2001 |
| JP | A 2002-4985 | 1/2002 |
| JP | A 2002-201998 | 7/2002 |
| JP | A 2002-317740 | 10/2002 |
| JP | A 2003-3887 | 1/2003 |
| JP | A 2003-328843 | 11/2003 |
| JP | A 2004-197725 | 7/2004 |
| JP | A 2004-204747 | 7/2004 |
| JP | A 2004-332599 | 11/2004 |
| JP | 2005-307826 | * 11/2005 |

* cited by examiner

200

START-UP CONTROL APPARATUS FOR AN INTERNAL COMBUSTION ENGINE

TECHNICAL FIELD

The present invention relates to a start-up control apparatus for an internal combustion engine.

BACKGROUND ART

In a conventional internal combustion engine, a Lenoir cycle start-type internal combustion engine is known in which the crankshaft is stopped within a predetermined crank angle range, which is midway through the expansion stroke, and start-up is carried out by supplying fuel corresponding to the amount of air in the cylinder during the expansion stroke when starting-up, and igniting and combusting the uncombusted mixture remaining in the valve (refer to Japanese Utility Model No. S60-128975, Japanese Patent Laid-Open No. JP-A-2002-317740, Japanese Patent Laid-Open No. JP-A-H11-107823, Japanese Patent Laid-Open No. JP-A-H2-271073, and Japanese Patent Laid-Open No. JP-A-2003-3887).

However, in the case in which uncombusted mixture remains in the cylinder that is in the expansion stroke when the engine is stopped, it is possible that this uncombusted mixture will self-ignite, that is, that this uncombusted mixture may combust even when the ignition signal is not ON. In addition, in the case in which the uncombusted mixture in the cylinder that is in the expansion stroke ignites and combusts when starting-up, the expansion of the combustion may be delayed and ensuring a favorable start-up becomes difficult.

In addition, in a system (what is termed an idle stop system) in which the operation of the internal combustion engine is automatically stopped while the vehicle is stopped, the stopping and starting-up of the operation of the internal combustion engine may frequently be repeated, and thus it is desirable that the start-up characteristics is further improved.

In consideration of the problems described above, it is an object of the present invention to provide a technology in which the start-up characteristics of the internal combustion engine are further improved.

DISCLOSURE OF THE INVENTION

In order to attain the objects described above, the invention employs the following structures.

Specifically, the present invention is directed to an internal combustion engine which is started up by using the pressure generated when the fuel combusts by predicting a stopped compression-stroke cylinder, which is in a compression stroke when operation of the internal combustion engine is stopped, by predicting a position at which rotation of the engine output shaft of an internal combustion engine stops; re-actuating the fuel injection valve of the stopped compression cycle cylinder after the actuation of the fuel injection valve stops when the engine stopping conditions for the internal combustion engine are satisfied or immediately before the rotation of the engine output shaft stops; sealing fuel in the stopped compression-stroke cylinder when the operation of the internal combustion engine is stopped; and combusting the fuel in the stopped compression-stroke cylinder during the subsequent start-up.

Here, even if the stopped compression-stroke cylinder can be predicted, it may not be the case that the stopped compression-stroke cylinder is in the compression stroke as was predicted when the operation of the internal combustion engine has actually stopped. This may be considered to be due to the influence of friction in the internal combustion engine or the influence of the state of the automatic transmission, and in the present invention, in particular, by taking these influences into account, start-up characteristics can be improved by more accurately predicting the position at which the rotation of the engine output shaft stops and the stopped compression-stroke cylinder.

Specifically, the present invention is directed to a start-up control apparatus for an internal combustion engine, comprising:

operation stopping means that stops actuation of a fuel injection valve that injects fuel into an intake passages of the internal combustion engine and actuation of a spark plug that ignites in the cylinders of the internal combustion engine when operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, a stopped compression-stroke cylinder, which is in a compression stroke when operation of the internal combustion engine is stopped;

fuel injection control means that re-actuates the fuel injection valve of the stopped compression-stroke cylinder that is predicted by the predicting means immediately before the rotation of the engine output shaft stops; and start-up control means that actuates the spark plug of the stopped compression-stroke cylinder that is predicted by the predicting means when the start-up conditions for the internal combustion engine are satisfied;

stop position detecting means that detects a stop position when the rotation of the engine output shaft stops;

position deviation calculating means that calculates the deviation between a position at which the stop position detecting means detects that the engine output shaft stops and a position at which the predicting means predicts that the engine output shaft stops; and correcting means that corrects the stop position that is predicted by the predicting means based on the amount of this deviation in a case in which the amount of deviation calculated by the position deviation calculating means is equal to or greater than a predetermined value.

For example, in the case in which the loss decreases due, for example, to friction in the internal combustion engine, the time from the stopping of the actuation of the fuel injection valves and the spark plugs to the stopping of the rotation of the engine output shaft (the rotation angle of the engine output shaft) will become longer than before the engine loss has decreased. Specifically, in the case in which the loss of the internal combustion engine has decreased, the engine output shaft will stop at a position that is further to the back (the side at which the rotation angle is large) than the position at which the engine output shaft is predicted to stop. Therefore, there are cases in which the position at which the stop position detecting means has detected that the engine output shaft has stopped deviates more towards the back (the side at which the rotation angle is large) than the position at which the engine output shaft is predicted to stop, and the position at which the predicting means has predicted that the engine output shaft will stop may be corrected such that the rotation angle becomes large. In this case, correction may be carried out such that the rotation angle becomes large as the amount of the deviation becomes large.

In addition, in the case in which loss increases due, for example, to friction in the internal combustion engine, the time (rotation angle) from the stopping of the actuation of the fuel injection valves and the spark plugs to the stopping of the rotation of the engine output shaft may become shorter than before the engine loss increase. Specifically, in the case in which the loss of the internal combustion engine has increased, the engine output shaft will stop further to the front (the side at which the rotation angle is small) than the position at which the engine output shaft is predicted to stop. Therefore, in cases in which the position at which the stop position detecting means has detected that the engine output shaft has stopped deviates more toward the front (the side where the rotation angle is small) than the position at which the engine output shaft was predicted to stop, the position at which the predicting means has predicted that the engine output shaft will stop may be corrected such that the rotation angle becomes small. In this case, the correction may be carried out such that the rotation angle becomes small as the amount of the deviation becomes large. Note that there are cases in which the reactive force of the compression stroke acts immediately before stopping and the position at which the engine output shaft stops is restored, and in this case, the correction may be applied at the attained angle immediately before stopping.

Here, the predicting means may be illustrated by a method in which, for example, during the required engine stopping time, which is the time from the stopping of the actuation of the fuel injection valves and the spark plugs to the stopping of the rotation of the engine output shaft, the rotation angle when an engine speed (the number of rotations of the engine) has fallen to a predetermined speed is used as a parameter to predict what the rotation angle will be when the engine is stopped. In addition, when the actuation of the fuel injection valves and the spark plugs has stopped, the internal combustion engine ceases to generate the torque that rotates the engine output shaft, and the engine output shaft rotates only due to inertia. Thus, the rotation angle when the engine stops may be predicted by using the rotation angle when the inertia (rotational energy) has fallen to a predetermined inertia as a parameter. In addition, instead of using the engine speed or the inertia, the time during which the engine output shaft rotates a predetermined interval of rotation may also be used.

In addition, examples of operation stop conditions for (automatically) stopping the internal combustion engine include a vehicle speed of zero; the brake switch being ON (the brake pedal being depressed or the parking brake being operated); the accelerator pedal not being depressed; the water temperature in the internal combustion engine being equal to or greater than a predetermined temperature (i.e., the internal combustion engine is in a warmed-up state); the automatic transmission being in a travel range (for example, the D (drive) range) or in a non-travel range (for example, the N (neutral) range); the battery charge amount not falling below a predetermined value (an example of such a condition is when operating of, for example, an air conditioner compressor or the alternator is not necessary), and the like. Note that instead of the vehicle speed being zero, for example, either the vehicle speed being zero or the vehicle being in a state of deceleration that will come to a stop may be used as one of the engine stopping conditions.

In addition, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in the cylinders of the internal combustion engine when operation stop conditions for the internal combustion engine are satisfied;

predicting means that predicts the position at which rotation of an engine output shaft of the internal combustion engine stops based on the engine speed that decreases due to the actuation of the fuel injection valve and the spark plug being stopped, and predicts the stopped compression-stroke cylinder, which is in a compression stroke when the operation of the internal combustion engine stops based on the position, wherein the predicting means predicts the engine speed decrease rate of the engine speed per predetermined time interval after the operation stopping means stops the actuation of the fuel injection valves and the spark plugs;

fuel injection control means that re-actuates the fuel injection valve of the stopped compression-stroke cylinder that is predicted by the predicting means immediately before the rotation of the engine output shaft stops;

start-up control means that actuates the spark plug of the stopped compression-stroke cylinder that is predicted by the predicting means when the start-up conditions for the internal combustion engine are satisfied; and correcting means that corrects the engine speed decrease rate that is predicted by the predicting means based on an amount of deviation in a case in which the engine speed decrease rate that is calculated by the predicting means deviates from a reference decrease rate.

For example, in the case in which loss decreases due, for example, to friction in the internal combustion engine, the engine speed reduction rate (the rotation state immediately before the engine output shaft stops) from the stopping of the actuation of the fuel injection valves and the spark plugs becomes smaller than before the loss decrease. Specifically, in the case in which the loss of the internal combustion engine has decreased, the engine output shaft will stop at a position that is further to the back (the side at which the rotation angle is large) than the position at which the engine output shaft was predicted to stop. Thus, in cases in which the engine speed reduction rate that has been predicted by the predicting means becomes smaller than a reference reduction rate; a correction may be carried out such that the engine rotation reduction rate that has been predicted by the predicting means is made small. In this case, a correction may be carried out such that the engine speed reduction rate becomes smaller as the amount of the deviation becomes larger.

In addition, in the case in which the loss increases due, for example, to friction in the internal combustion engine, the engine speed reduction rate from the stopping of the actuation of the fuel injection valves and the spark plugs becomes larger than before the loss increase. Specifically, in the case in which the loss of the internal combustion engine has increased, the engine output shaft will stop at a position that is further to the front (the side at which the rotation angle is small) than the position at which the engine output shaft is predicted to stop. Therefore, there are cases in which the engine speed reduction rate that has been predicted by the predicting means becomes larger than a reference reduction rate, and the engine speed reduction rate that has been predicted by the predicting means may be corrected so as to become large. In this case, correction may be carried out such that the engine speed reduction rate becomes larger as the amount of the deviation becomes larger.

In addition, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in a cylinder of the internal combustion engine when the operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, the stopped compression-stroke cylinder, which is in a compression stroke when operation of the internal combustion engine is stopped;

fuel injection control means that re-actuates the fuel injection valve of the stopped compression-stroke cylinder that is predicted by the predicting means immediately before the rotation of the engine output shaft stops;

start-up control means that actuates the spark plug of the stopped compression-stroke cylinder that is predicted by the predicting means when the start-up conditions for the internal combustion engine are satisfied; and correcting means that corrects the stop position that is predicted by the predicting means based on a shift speed of an automatic transmission.

During the time interval required for the engine to stop, in the case in which the automatic transmission is in a travel range such as the D range, because an amount of loss due to the torque converter is added, the loss in the internal combustion engine increases more than the case of the non-travel range (the N range). Therefore, in the case in which the automatic transmission is in a travel range such as the D range, the rotation angle from the stopping of the actuation of the fuel injection valves and the spark plugs to the stopping of the rotation of the engine output shaft may stop before (the side at which rotation angle is small) the position at which the engine output shaft is predicted to stop. Therefore, in the case in which the automatic transmission is in the travel range, the position at which the predicting means has predicted that the engine output shaft will stop may be corrected such that the rotation angle becomes small. In addition, during the time required for the engine to stop, in the case in which the automatic transmission is in the non-travel range, the position at which the predicting means has predicted that the engine output shaft will stop may be corrected such that the rotation angle becomes large.

In addition, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in the cylinders of the internal combustion engine when the operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, a stopped compression-stroke cylinder, which is in a compression stroke when operation of the internal combustion engine is stopped;

fuel injection control means that re-actuates the fuel injection valve of the stopped compression-stroke cylinder that is predicted by the predicting means immediately before the rotation of the engine output shaft stops; and start-up control means that actuates the spark plug of the stopped compression-stroke cylinder that is predicted by the predicting means when the start-up conditions for the internal combustion engine are satisfied; and correcting means that corrects the stopping position that is predicted by the predicting means in a case in which the operation stopping means stops the actuation of the fuel injection valves and the spark plugs when the operating stopping conditions during vehicle travel are satisfied and the automatic transmission is in a travel range.

Here, a case in which the operation stop conditions during vehicle travel are satisfied is, for example, the case in which the operation stop conditions include the vehicle being in a decelerated state that will come to a stop. In addition, the operation stop conditions during the vehicle travel may also be considered to be satisfied in the case in which it is determined by the stop determining means, which determines whether the rotation of the engine output shaft has stopped, that the rotation of the engine output shaft has not stopped following the passage of a predetermined time interval after the operation stopping means has stopped the actuation of the fuel injection valves and the spark plugs.

In the case in which the actuation of the fuel injection valves and the spark plugs is stopped because the operation stop conditions during vehicle travel are considered to be satisfied and the automatic transmission is in the travel range, a state occurs in which the rotation of the torque converter is transferred to the engine output shaft and the internal combustion engine rotates due to the reverse drive, and the loss due, for example, to friction in the internal combustion engine tends to decrease. That is, in such a case, the rotation angle from the stopping of the actuation of the fuel injection valves and the spark plugs to the stopping of the rotation of the engine output shaft is more to the back (i.e., the side at which the rotation angle is large) than the position at which the engine output shaft is predicted to stop. Therefore, in such a case, the position at which the predicting means has predicted that the engine output shaft will stop may be corrected such that the rotation angle becomes large.

Additionally, in the present invention, in addition to the stopped compression-stroke cylinder, by further carrying out fuel injection in the stopped intake-stroke cylinder, which is in the intake stroke when the operation of the internal combustion engine is stopped, the start-up characteristics of the internal combustion engine can be improved.

In this case, the switching of the injection timing of the fuel injection to the stopped intake-stroke cylinder is carried out based on the position at which the engine output shaft is predicted to stop when the engine operation stops and the actual stop position where the engine output shaft stops when the operation of the engine has stopped.

Specifically, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in a cylinder of the internal combustion engine when operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, a stopped compression-stroke cylinder, which is in a compression stroke when the operation of the internal combustion engine is stopped;

fuel injection control means that re-actuates the fuel injection valve of the stopped compression-stroke cylinder that is predicted by the predicting means immediately before the rotation of the engine output shaft stops; and start-up control means that actuates the spark plug of the stopped compression-stroke cylinder that is predicted by the predicting means when the start-up conditions for the internal combustion engine are satisfied, wherein the predicting means further predicts a stopped intake-stroke cylinder, which is in a intake stroke, from the position at which the engine output shaft is predicted to stop, the fuel injection control means further re-actuates the fuel injection valve of the stopped intake-stroke cylinder that is predicted by the predicting means, and switches an actuation timing (the actuation timing, the actuation time interval, the actuation amount, and the like) of the fuel injection valve based on a position at which the predicting means predicts that the engine output shaft stops; and the start-up control means further actuates the spark plug of the stopped intake-stroke cylinder that is predicted by the predicting means.

In addition, it is preferable that the start-up control apparatus for an internal combustion engine further comprises stop position detecting means that detects the position at which the rotation of the engine output shaft has stopped, wherein the fuel injection control means:

actuates the fuel injection valve immediately before the rotation of the engine output shaft stops in a case in which the predicting means predicts that the position at which the engine output shaft stops is a position at which a stopping position of the piston of the stopped intake stroke valve is in proximity to bottom dead center;

actuates the fuel injection valves during the engine start-up in a case in which the predicting means predicts that the position at which the engine output shaft stops is not a position at which the stopping position of the piston of the stopped intake stroke valve is in proximity to bottom dead center; and actuates the fuel injection valve when the rotation of the engine output shaft stops, in a case in which the predicting means predicts that the position at which the engine output shaft stops is such a position that the stopping position of the piston of the stopped intake-stroke cylinder is not in proximity of bottom dead center, but the stop position detecting means detects that the stopping position of the engine output shaft is such a position that the stopping position of the piston of the stopped intake-stroke cylinder is in proximity of bottom dead center.

In addition, the fuel injection control means preferably further actuates the fuel injection valves in the case in which a time interval during which the rotation of the engine output shaft stops exceeds a predetermined time interval immediately before the rotation of the engine output shaft stops or after actuating the fuel injection valves when the rotation of the engine output shaft stops.

Here, in the case in which the spark plug of the stopped compression-stroke cylinder is actuated during the engine start-up, there is the possibility that engine knock, damaging vibration, or noise will be generated. This is considered to be due to the torque, which is generated when the spark plugs are ignited due to actuation during engine start-up, rapidly becoming large in the case in which the stopped compression stoke cylinder seals much intake air when the operation of the internal combustion engine has been stopped because the volume (capacity) of the stopped compression-stroke cylinder that can be sealed when the operation of the internal combustion engine is stopped differs depending on the position when stopped. Thus, in the present invention, the injection timing is switched based on the position at which the engine output shaft has stopped.

Specifically, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in a cylinder of the internal combustion engine when the operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, the stopped compression-stroke cylinder, which is in a compression stroke when the operation of the internal combustion engine is stopped;

fuel injection control means that re-actuates the fuel injection valve of the stopped compression-stroke cylinder that is predicted by the predicting means immediately before the rotation of the engine output shaft stops;

start-up control means that actuates the spark plug of the stopped compression-stroke cylinder that is predicted by the predicting means when the start-up conditions for the internal combustion engine are satisfied; and stop position detecting means that detects the position at which the rotation of the engine output shaft stops, wherein the start-up control means switches an ignition timing at which the spark plug is actuated based on the position at which the stop position detecting means detects that the engine output shaft stops.

Here, at the position at which the engine output shaft has stopped, the ignition timing may be delayed as the position at which the piston of the stopped compression-stroke cylinder stops becomes close to bottom dead center. Thereby, even when much intake air is sealed in a cylinder, it is possible to suppress the torque, which is generated when a spark plug is ignited due to actuation during the engine start-up, from rapidly becoming large, and it becomes possible to suppress the generation of engine knock, damaging vibration, and noise.

In addition, in the case in which the fuel injection amount is calculated based on the flow rate of the air that is drawn into the internal combustion engine, an intake air amount detecting means, which detects the flow rate of the air drawn into the internal combustion engine, is normally provided along the intake passage. Thereby, during the engine start-up, there is a time interval during which the value detected by the intake air amount detecting means cannot be effectively used because air that is present in the intake passage between the intake air amount detecting means and the cylinder is drawn into the cylinder.

Thus, in the present invention, until the intake air amount detecting means becomes effective, the amount of air that is drawn into the cylinder is predicted taking into account the influence, for example, of the volume inside the intake passage between the intake air amount detecting means and the cylinder.

Specifically, the present invention is directed to a start-up control apparatus for an internal combustion engine, comprising:

operation stopping means that stops actuation of a fuel injection valve that injects fuel into the intake passages of the internal combustion engine and actuation of a spark plug that ignites in a cylinder of the internal combustion engine when operation stop conditions for the internal combustion engine are satisfied;

predicting means that predicts a position at which rotation of an engine output shaft of the internal combustion engine stops due to the actuation of the fuel injection valve and the spark plug being stopped, and predicts based on the position, a stopped compression-stroke cylinder, which is in a compression stroke when operation of the internal combustion engine is stopped;

fuel injection control means that re-actuates the fuel injection valve of the stopped compression-stroke cylinder that is predicted by the predicting means immediately before the rotation of the engine output shaft stops;

start-up control means that actuates the spark plug of the stopped compression-stroke cylinder that is predicted by the predicting means when the start-up conditions for the internal combustion engine are satisfied; and fuel injection amount calculating means that predicts, during a predetermined time interval after engine start-up, an amount of air that is drawn into the cylinder based on the engine speed, the position at which the engine output shaft stops, the volume inside the intake passage, and the number of times that the intake stroke has been carried out, and calculates the injection fuel amount for the cylinder based on the predicted amount of air.

Here, the fuel injection amount calculating means, in addition to the parameters described above, may predict the amount of air that is drawn in to a valve by also taking into consideration the amount of air that leaks out upstream from the air metering valve (throttle valve) that adjusts the flow rate of the intake air that flows through the intake passage and the amount of air that leaks out upstream from the valve that controls the idle speed of the engine so as to attain a target speed (what is called the idle speed control valve) by adjusting the engine intake air amount during idle by controlling the amount of air that flows through the bypass duct that bypasses the intake metering valve. When an idle speed control valve is not provided (the case in which the intake metering valve performs this function), only the leak-out rate from the intake metering valve needs to be taken into consideration. Note that the predetermined time interval after the engine start-up is the time interval that lasts until the intake air amount detecting means, which detects the flow rate of the air that is drawn into the engine during the engine start-up, becomes effective, and denotes the time interval that lasts until the influence of the air that is present inside the intake passage has been eliminated. Thereby, even during the time until the intake air detecting means becomes effective, because the fuel injection amount is calculated by predicting the amount of air that is drawn into the cylinder, the start-up characteristics of the internal combustion engine can be further improved.

Note that each of the structures described above may be used in combination to the extent possible.

BEST MODES FOR CARRYING OUT THE INVENTION

Examples of the best modes for carrying out the present invention will be explained in detail using examples with reference to the drawings.

Figure 1:
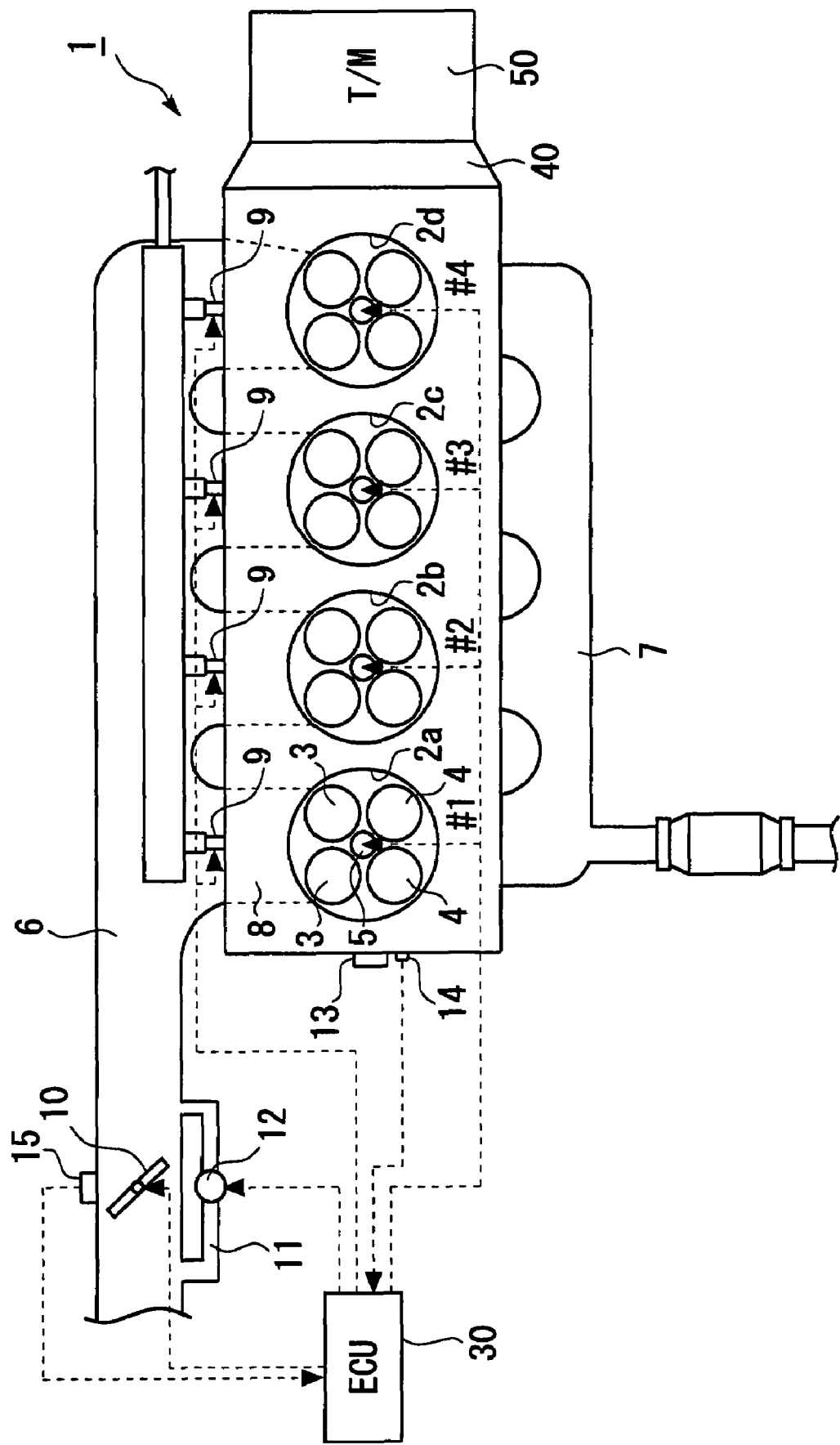
FIG. 1 is a schematic structural drawing showing an internal combustion engine to which a start-up control apparatus according to an embodiment of the present invention is applied.

FIG. 1 is a schematic structural drawing showing an internal combustion engine in which the start-up control apparatus according to an embodiment of the present invention is applied.

In FIG. 1, an internal combustion engine 1 is an inline four-cylinder gasoline engine, in which four cylinders 2 (a first cylinder (#1) 2a, a second cylinder (#2) 2b, a third cylinder (#3) 2c, and a fourth cylinder (#4) 2d) are disposed in a single row. In addition, a transmission (T/M) 50 is linked to this internal combustion engine 1 via a torque converter (or a clutch mechanism) 40.

The transmission (T/M) 50 is linked to the wheels that act as the drive wheels via a propeller shaft, a differential gear, and the like (not illustrated). In a power transmission system structured in this manner, while the torque converter 40 is engaged, the rotational force of the engine output shaft (crankshaft) 13 of the internal combustion engine 1 is transferred to the transmission (T/M) 50 via the torque converter 40; decelerated or accelerated in the transmission (T/M); and then transferred to the wheels that act as the drive wheels from the transmission (T/M) 50 via the propeller shaft, the differential gear, and the like.

In addition, in each of the cylinders 2 in the internal combustion engine 1, intake valves (IN valves) 3 and discharge valves 4 are provided along with a spark plug 5 (in FIG. 1, only the first cylinder 2a is illustrated, but the other cylinders are identical). The internal combustion engine 1 is connected to an intake passage 6 and a discharge passage 7.

The intake passages 6 communicate with each of the cylinders 2 of the internal combustion engine via intake ports 8. A fuel injection valve 9 is mounted on each of the intake ports 8, thereby enabling the fuel injection valve 9 to inject fuel into the intake ports 8.

In addition, an intake metering valve (throttle valve) 10 that adjusts the flow rate of the intake air that flows through the intake passage 6 is provided on the intake passages 6. This intake metering valve 10 is an electronically controlled on-off valve whose aperture can be continuously adjusted, and has the function of changing the flow area for the intake air under predetermined conditions to adjust the amount (flow rate) of intake air that is supplied.

In addition, the intake passage 6 is provided with a bypass duct 11 and an idle speed control valve (ISC valve) 12. The bypass duct 11 bypasses the intake metering valve 10. The idle speed control valve (ISC valve) 12 controls the idle speed of the engine so as to attain a target speed by adjusting the engine intake air amount during idle by controlling the amount of air that flows through the bypass duct 11.

In addition, a crank position sensor 14 that outputs a pulse signal each time the crankshaft 13 has rotated a predetermined angle (for example, 10°) is provided in the internal combustion engine 1. A resolver rotation sensor or an MRE (magnetic resistance element) rotation sensor, for example, may be used for the crank position sensor 14. When two MRE rotation sensors are used, the detection of reverse rotation also becomes possible.

An electronic control unit (ECU) 30 for controlling the internal combustion engine 1 is linked to the internal combustion engine 1 having such a structure. This ECU 30 is provided with a logic processing circuit that includes a central processing unit (CPU), read-only memory (ROM), random access memory (RAM), back up RAM, and the like. Based on signals from each type of sensor, for example, the operating state of the internal combustion engine 1 is detected, and each type of structural component of the internal combustion engine 1 is integrally controlled.

In addition to the crank position sensor 14 described above, an air flow meter 15, which forms the intake air amount detecting means that detects the amount of air that is drawn into each of the cylinders 2, a vehicle speed sensor, a brake switch, an accelerator position sensor, and the like, are electronically connected to the ECU 30. The output signals thereof are input to the ECU 30.

In addition, in the basic routine that is executed at constant time intervals, the ECU 30 executes, for example, inputting the output signals of each type of sensor, calculating the engine speed, calculating the engine load, calculating the fuel injection amount, calculating the fuel injection timing, and the like. In the basic routine, each type of control signal that has been input to the ECU 30 and each type of control value that the ECU 30 has obtained by calculation are temporarily stored in the RAM of the ECU 30.

Furthermore, during interrupt processing that has been triggered by the input of signals from each type of sensor and switch, the passage of a predetermined time interval, or the input of pulse signals from the crank position sensor 14, the ECU 30 reads each type of control value from the RAM, controls the spark plugs 5, the fuel injection valves 9 and the like according to these control values, and then executes the start-up control of the internal combustion engine according to the present embodiment.

Here, the ECU 30 constitutes, together with the sensors that provide information related to the operating state of the internal combustion engine 1, operation stop means, predicting means, fuel injection control means, start-up control means, correcting means, stop position detecting means, and fuel injection amount calculating means according to the present invention.

While the internal combustion engine 1 is in the operating state, for example, when the output sensor for the brake switch is ON and the output signal of the vehicle speed sensor is "0", in other words, when the vehicle is in the stopped state while the internal combustion engine 1 is in the operating state, the ECU 30 temporarily stops the operation of the internal combustion engine 1 by temporarily stopping the actuation of the spark plugs 5 and the fuel injection valves 9.

Subsequently, when the output signal of the brake switch is switched from ON to OFF, the ECU 30 starts up the internal combustion engine 1 by actuating the starter motor along with actuating the spark plugs 5 and the fuel injection valves 9, and thereby the operation of the internal combustion engine 1 is restarted.

Here, as described above, when the internal combustion engine 1 is automatically switched from the stopped state to start-up, at the point in time that the output signal of the brake switch is switched from ON to OFF, the internal combustion engine 1 must be started up quickly and smoothly, that is, a more favorable operating feel is required.

Thus, in the internal combustion engine 1 of the present embodiment, the ECU 30 executes the start-up control described below when the internal combustion engine 1 starts up.

Figure 2:
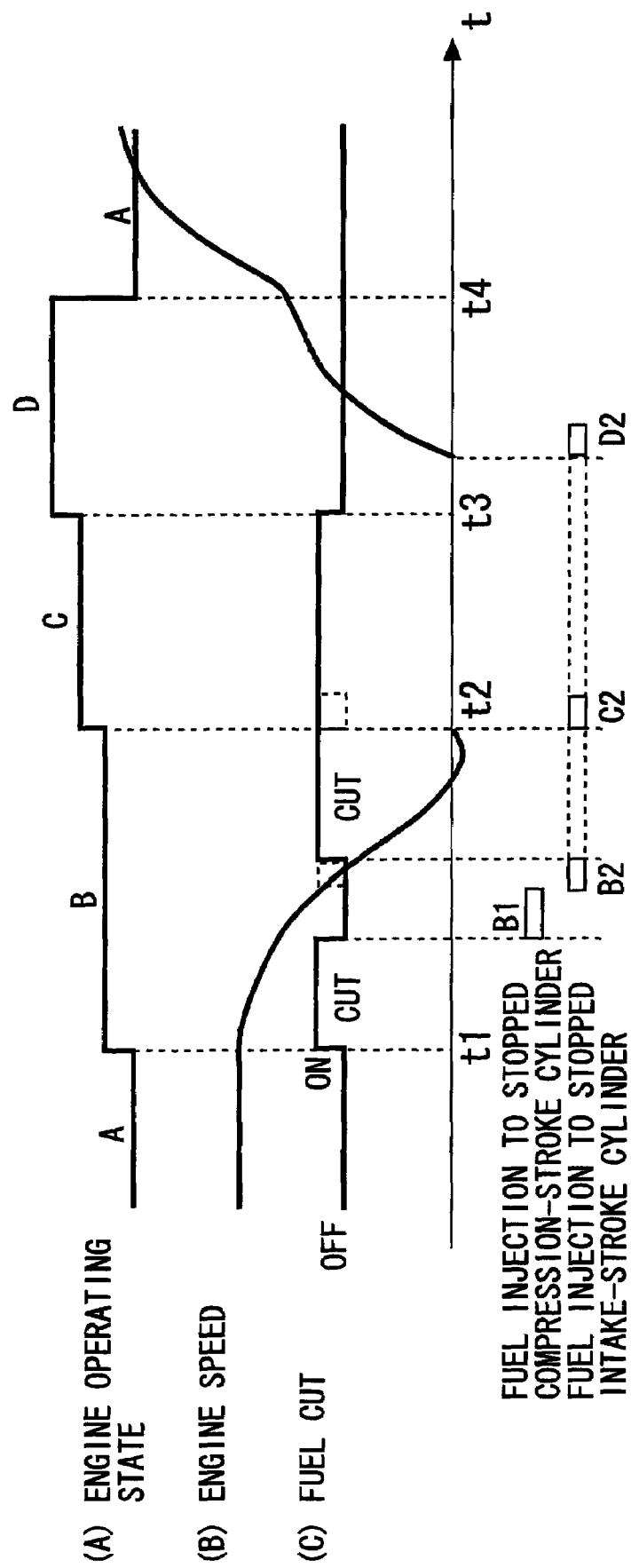
FIG. 2 is a drawing showing a timing chart for the overall start-up control for an internal combustion engine according to the present embodiment.

FIG. 2 is a drawing showing a timing chart of the overall start-up control for the internal combustion engine 1 according to the present embodiment. In FIG. 2, (A) shows the operating state of the internal combustion engine 1, and during the time interval t1 to t4, the actuation state of the internal combustion engine 1 is shown respectively in the normal actuation state A, the stopping state B, the stopped state C, and the engine start-up state D. In addition, (B) shows the engine speed, and during the time interval (the interval up to t1) in which the internal combustion engine 1 is in the normal operating state A, shows that the internal combustion engine 1 is in the idle operating state. (C) shows the actuating-signal that actuates the fuel cut (temporarily stopping the actuation of the fuel injection valve 9) during the fuel injection control.

Here, in FIG. 2(A), the stopping state shown by reference letter B denotes the time interval from t1 in which the actuation of the fuel injection valve 9 and the spark plugs 5 is stopped (i.e., the fuel cut is performed) along with the requirement of stopping of the engine operation until the rotation of the crankshaft 13 (i.e., time interval required for the engine to stop) is stopped, in the case in which the engine operation stopping conditions are satisfied.

In the start-up control of the present embodiment, the ECU 30 predicts the stopped compression-stroke cylinder, which is in the compression stroke when the engine operation is stopped, by predicting the position at which the rotation of the crankshaft 13 stops when the engine operation is stopped, that is, what is termed that the rotation angle (crank angle (CA)) of the crankshaft 13.

With respect to the crank angle when the rotation of the crankshaft 13 has stopped, for example, at the stopping state B shown in FIG. 2(A), the crank angle when the engine speed is decreased to a specified speed can be predicted as a parameter. For example, it is possible to predict the crank angle at which the rotation of the crankshaft 13 will stop at the point in time when the engine speed reaches a specified engine speed, by finding in advance the specified engine speed that permits a specified crankshaft angle rotation (for example, about two rotations) until the rotation of the crankshaft 13 stops. In addition, it is possible to predict the stopped compression-stroke cylinder, which is in the compression stroke when the engine operation is stopped, from the crank angle at this time.

Figure 3:
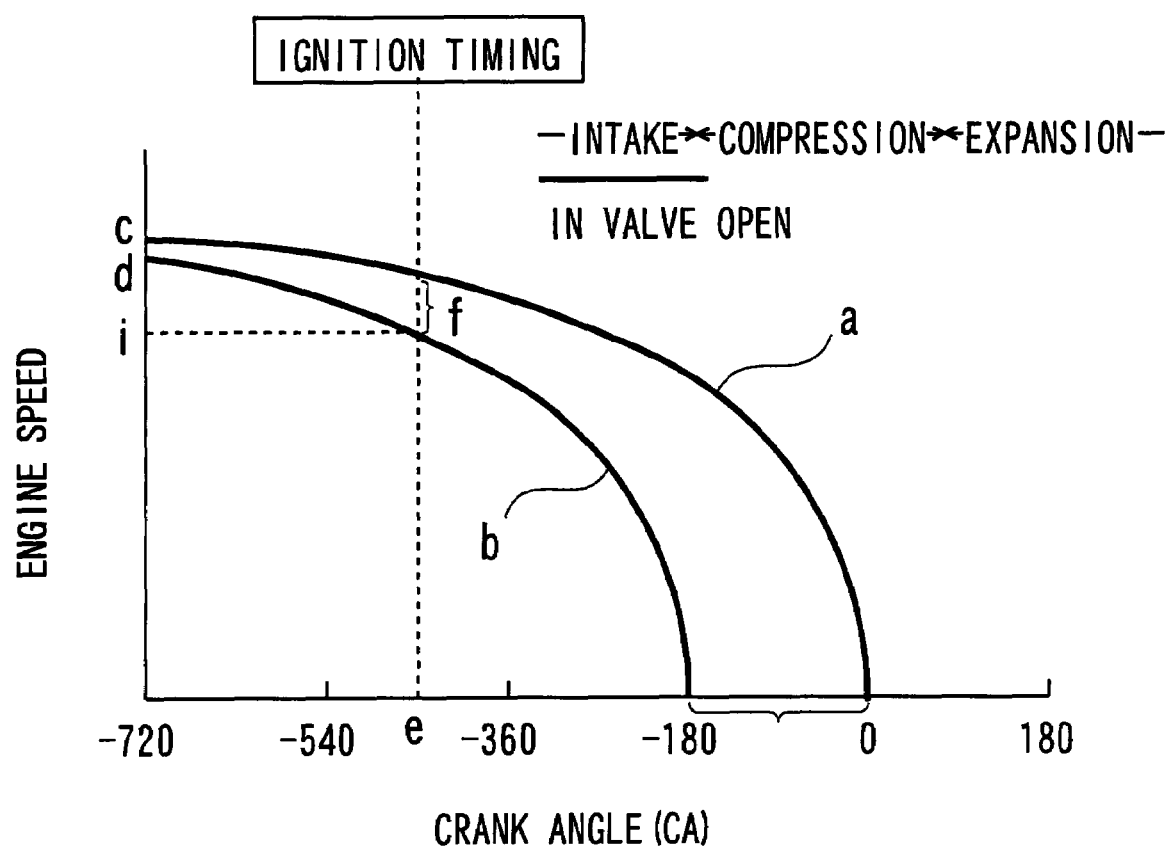
FIG. 3 is a drawing showing the relationship between the engine speed, the crank angle, and the fuel injection timing when the engine operation is stopped in a compression-stroke cylinder when the internal combustion engine is stopped according to the present embodiment.

FIG. 3 is a drawing showing the relationship among the engine speed, the crank angle, and the fuel injection timing when the engine operation is stopped for the stopped compression-stroke cylinder of the internal combustion engine 1 according to the present embodiment. The relationship among the decreasing engine speed associated with the stopping of the operation of the internal combustion engine 1, the crank angle, and the fuel injection timing can be found experimentally and mapped in advance.

In FIG. 3, the curve "a" represents the relationship between the engine speed and the crank angle when the rotation of the crankshaft 13 has stopped at compression top dead center (TDC; below also referred to as compression TDC). Note that in the present embodiment, in the explanation the crankshaft angle of the crankshaft 13 at compression TDC is 0°. In FIG. 3, the curve "b" represents the relationship between the engine speed and the crank angle when the rotation of the crankshaft 13 stops at bottom dead center (BDC) during the compression stroke (below, also referred to as compression BDC), that is, stops at a −180° crank angle.

In addition, in FIG. 3, in the case in which the crank angle is −720° and the case in which the engine speed has attained "c" (a specified engine speed), it is predicted that the rotation of the crankshaft 13 will stop at compression TDC. In addition, in the case in which the crank angle is −720° and the engine speed is "d" (a specified engine speed), it is predicted based on FIG. 3 that the rotation of the crankshaft 13 will stop at −180°.

Figure 4:
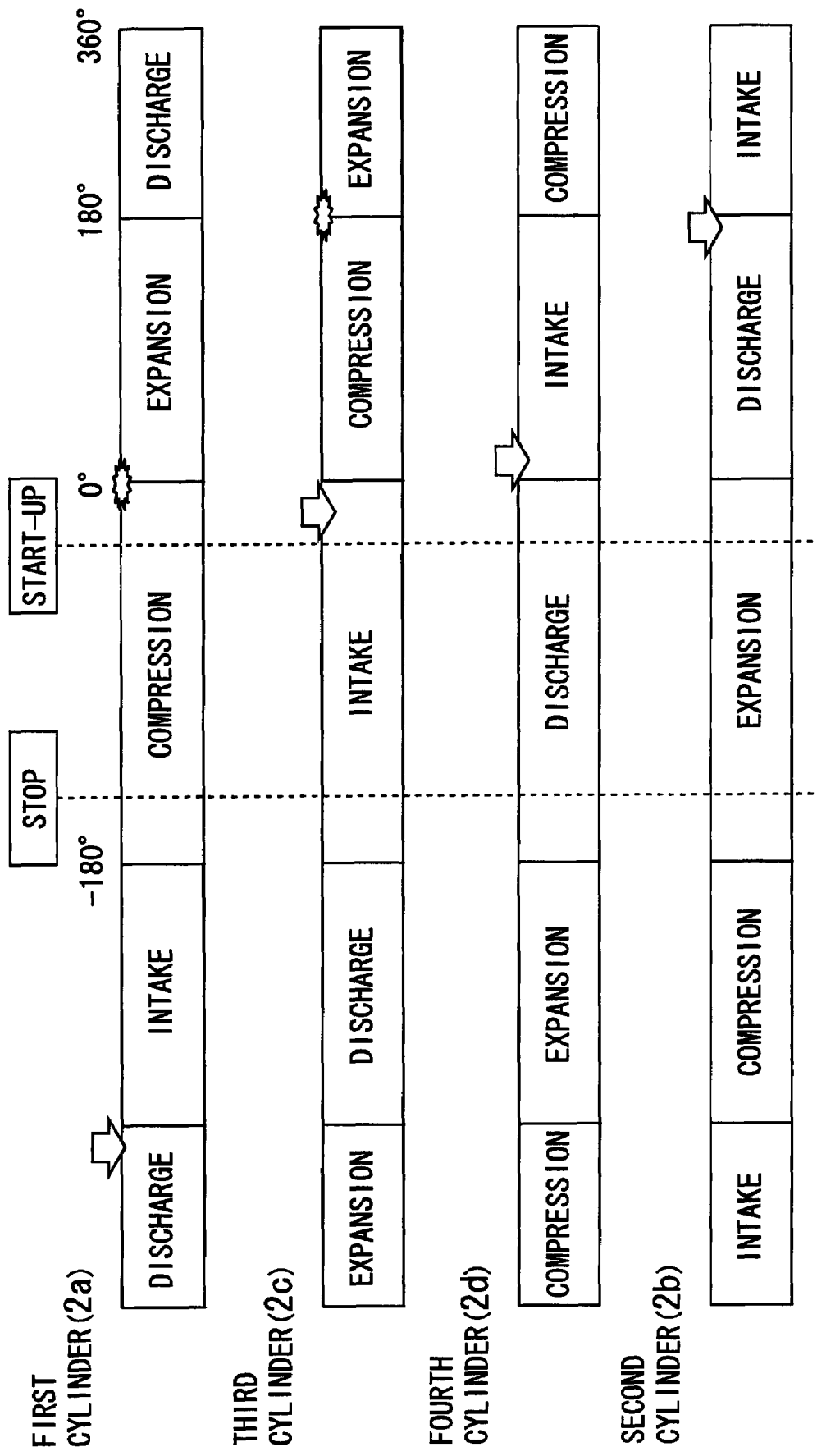
FIG. 4 is a drawing schematically showing the state for each of the cylinders in an internal combustion engine according to the present embodiment.

FIG. 4 is a drawing that schematically shows the state of each of the cylinders in the internal combustion engine 1 according to the present invention. Note that in FIG. 4, the case is shown in which the ignition sequence of the internal combustion engine 1 progresses through the first valve 1a, the third valve 2c, the fourth valve 2d, and then the second valve 2b. In addition, FIG. 4 shows the case in which the rotation of the crankshaft 13 has stopped and the operation of the internal combustion engine 1 has stopped while the first cylinder 2a is in the compression stroke, and below, in the explanation, the crank angle of the crankshaft 13 in the first cylinder 2a, which is at compression TDC, is at 0°.

In FIG. 4, the arrow positioned at the portion of the discharge stroke of the first cylinder 2a indicates the fuel injection timing by the fuel injection valve 9 that corresponds to the first cylinder 2a, and the mark positioned between the compression stroke and the expansion stroke indicates the ignition timing by the spark plug 5 that corresponds to the first cylinder 2a. The arrows and the marks indicate identical items for the other cylinders.

Here, as shown in FIG. 4, the fuel injection control is explained in which the first cylinder 2a is the stopped compression-stroke cylinder.

Similar to the prediction of the position at which the rotation of the crankshaft 13 will stop as described above, a specified engine speed is found in advance that permits the rotation of the crankshaft 13 to continue to a predetermined crank angle (for example, about 1.5 rotations) until the rotation of the crankshaft 13 has stopped. Here, the fuel injection control is carried out such that when the engine speed has attained the specified engine speed, the fuel injection valve 9 of the first cylinder 2a, which is the cylinder that has been predicted will be the stopped compression-stroke cylinder, is actuated, and an air-fuel mixture is formed by the injected fuel being drawn into the cylinder 2a along with the air that is flowing through the intake port 8.

As can be understood from FIG. 3, at a predetermined crank angle "e" immediately before the rotation of the crankshaft 13 has stopped, when the engine speed is in a range "f" (the specified engine speed) between the curves a and b, fuel injection is carried out by actuating the fuel injection valve 9.

By carrying out such control, the uncombusted fuel-air mixture can be sealed in the stopped compression-stroke cylinder, which is in the compression stroke at the point in time that the rotation of the crankshaft 13 has stopped.

Here, there are cases in which the cylinder that is predicted to be in the compression stroke by the method described above actually stops after passing compression TDC and advances to the expansion stroke. This is because the loss due to friction and the like in the internal combustion engine has decreased, and in the prediction of the stopped compression-stroke cylinder, an error occurs in the setting of the relationship between the engine speed and the crank angle.

In addition, there are cases in which the cylinder that is predicted to stop in the compression stroke by the method described above actually does not pass the compression BDC and stops at the intake stroke. In addition, there are cases in which a cylinder that has not been predicted to stop in the compression stroke (that is, a cylinder in which fuel injection has not been performed) stops at the compression stroke. This is because the loss due to friction and the like in the internal combustion engine has increased, and in the prediction of the stopped compression-stroke cylinder, an error occurs in the setting of the relationship between the engine speed and the crank angle.

Thus, in such cases, in the present embodiment the relationship between the engine speed and the crank angle is corrected while learning the frequency thereof.

Specifically, the crank angle at the position at which the rotation of the crankshaft 13 has stopped is actually measured by using the crank position sensor 14 and then compared to the crank angle when stopped that has been predicted by the method described above. In the case in which the amount of the deviation is equal to or greater than a predetermined value, the relationship between the engine speed and the crank angle is corrected while learning the frequency with which this deviation occurs. Here, a predetermined value denotes a value that takes into consideration the error that occurs, for example, as a characteristic that is unique to the sensor.

For example, in the case in which the cylinder that is predicted to stop at the compression stroke is the first cylinder 2a, when the crank position sensor 14 detects that the crank angle when the rotation of the crankshaft 13 has stopped is in a range of −180° to 0°, as predicted, the first valve 2a stops in the compression stroke. However, in the case in which the friction in the internal combustion engine 1 has decreased, the crank angle when the rotation of the crankshaft 13 has stopped is in a range of 0° to 180°, and the first cylinder 2a, which is predicted will stop at the compression position, may actually stop after passing the compression TDC and advance to the expansion stroke. In addition, in the case in which the friction in the internal combustion engine 1 has increased, the crank angle when the rotation of the crankshaft 13 has stopped is in a range of −360° to −180°, and the first cylinder 2a, which is predicted will stop in the compression stroke, may actually not pass the compression BDC and stop at the intake stroke.

Figure 5:
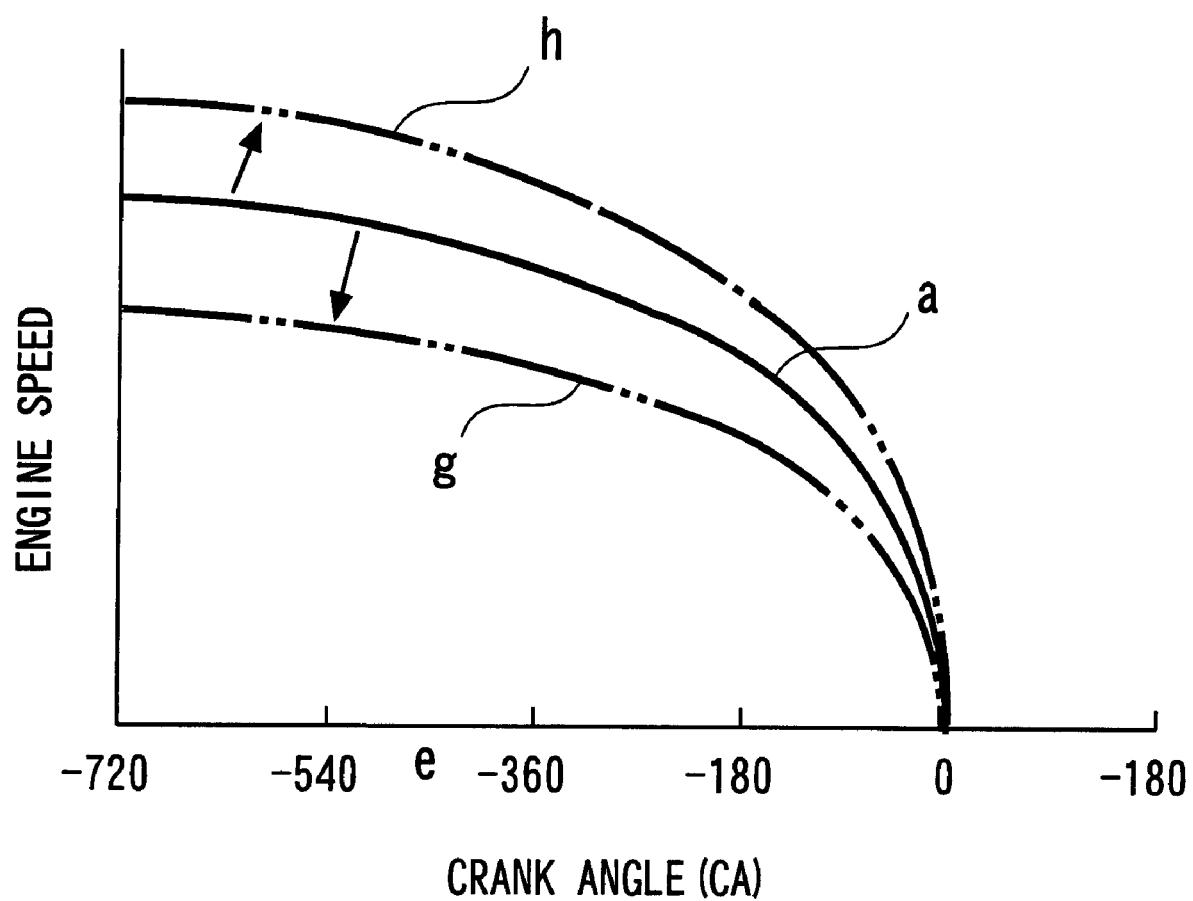
FIG. 5 is a drawing showing the relationship between the engine speed and the crank angle when the engine operation is stopped in a stopped compression-stroke cylinder in an internal combustion engine according to the present embodiment.

Thus, in the case in which the friction in the internal combustion engine 1 has decreased, in order to rotate a predetermined crank angle, the engine speed is set so as to become smaller than the reference engine speed. That is, as shown by the curve "g" in the map shown in FIG. 5, the engine speed is corrected toward the side at which the rotation is lower than the curve "a" (the reference engine speed). Here, FIG. 5 is a drawing showing the relationship between the engine speed and the crank angle when the engine operation is stopped for the compression-stroke cylinder in the internal combustion engine 1 according to the present embodiment, and the curve "a" that is shown in FIG. 5 corresponds to the curve "a" that is shown in FIG. 3.

In addition, in the case in which the friction in the internal combustion-engine 1 has increased, in order to rotate a predetermined crank angle, the engine speed is set so as to become larger than the reference engine speed. That is, in the map shown in FIG. 5, the engine speed is corrected toward the side at which the rotation is higher than the curve "a", as shown by curve "h".

In the above explanation, for the crank angle when the rotation of the crankshaft 13 has stopped, the relationship between the engine speed and the crank angle was corrected by comparing the predicted value and the measured value, but this is not limiting. For example, learning control may be carried out so as to be able to ascertain the fluctuation of the overall loss due to friction over time and the like, in which the map that shows the relationship between the engine speed and the crank angle is updated incrementally by monitoring the decrease rate of the engine speed (the degree of the decrease in the engine speed per predetermined time interval (for example, a unit time); for example, the slope of the curve "a" show in FIG. 3) when the conditions such as the cooling water temperature and the lubricating oil temperature in the internal combustion engine are all satisfied. In this case, if the decrease rate of the engine speed is larger than a reference decrease rate (for example, the slope of the curve "a" shown in FIG. 3), the engine speed is corrected toward the side at which the speed is higher than the curve "a" (such that the slope becomes larger; such that the decrease rate becomes large), as shown by the curve "h" in the map shown in FIG. 5. In addition, if the decrease rate of the engine speed is smaller than the reference decrease rate, the engine speed is corrected toward the side at which the speed is lower than the curve "a" (such that the slope becomes small; or such that the decrease rate becomes small), as shown by the curve "g" in the map shown in FIG. 5.

In addition, the relationship between the engine speed and the crank angle may be corrected based on the shift range of the automatic transmission.

When the automatic transmission is in a travel range such as the D range, the amount of loss of the torque converter 40 due to the vehicle moving slowly forward, which is termed creep, must be added. Thus, in the case in which the automatic transmission is in a travel range, similar to the case in which the friction in the internal combustion engine has increased, the engine speed is corrected toward the side at which the speed is higher than the curve "a", as shown by the curve "h" in the map shown in FIG. 5. In addition, in the case in which the automatic transmission is in a non-travel range (N range), the engine speed is corrected toward the side at which the speed is lower than the curve "a", as shown by the curve "g" in the map shown in FIG. 5.

In addition, for example, in the case in which the engine operation stopping conditions include whether the vehicle is in a deceleration state that will reach a stop is, there are cases in which the internal combustion engine 1 will stop during vehicle travel when the automatic transmission is in a travel range such as the D range. In such a case, the relationship between the internal combustion engine 1 and the automatic transmission becomes a reverse drive relationship, the internal combustion engine 1 is driven by the transmission (T/M) 50 side, and torque is generated in a direction in which the rotation of the internal combustion engine 1 increases. This can be treated as a reduction in the friction of the internal combustion engine 1. Therefore, a correction can be carried out that is similar to the case in which the friction of the internal combustion engine decreases, as described above. That is, in the case in which the internal combustion engine 1 has stopped while the vehicle is traveling with the automatic transmission in the travel range, the engine speed may be corrected toward the side at which the speed is lower than the curve "a", as shown by the curve "g" in the map shown in FIG. 5.

In addition, in the state in which the engine is stopping, the amount of the friction acting on the internal combustion engine 1 fluctuates, for example, according to the temperature of the lubricating oil, the state of degradation of the lubricating oil, the temperature of the cooling water and the like, and thus, the relation between the engine speed and the crank angle may be corrected based on the temperature of the lubricating oil, the state of degradation of the lubricating oil, the temperature of the cooling water and the like.

Next, the stopped intake-stroke cylinder, which is in the intake stroke when the engine operation is stopped, will be explained.

In the present embodiment, fuel is sealed in the stopped compression-stroke cylinder, which is in the compression stroke when the engine is stopped, and subsequently fuel will be injected into the cylinder that enters the compression stroke after the stopped compression-stroke cylinder that seals fuel, that is, the stopped intake-stroke cylinder, which is in the intake stroke when the engine operation is stopped. In addition, the injection timing for the fuel injection in the stopped intake-stroke cylinder is characterized in carrying out switching when the engine operation is stopped based on the position at which the crankshaft 13 is predicted to stop and the actual position at which the crankshaft 13 has stopped.

Here, during engine start-up, combustion in the stopped intake-stroke cylinder, which is in the intake stroke when the engine operation is stopped, is carried out after the stopped compression-stroke cylinder, which is in the compression stroke when the engine operation is stopped, has combusted. Therefore, in the present embodiment, the stopped compression-stroke cylinder, which is in the compression stroke when the engine operation is stopped, may also be referred to as the first stroke cylinder, and the stopped intake-stroke cylinder, which is in the intake stroke when the engine operation is stopped, may also be referred to as the second stroke cylinder.

Because the first cycle cylinder and the second cycle cylinder are offset by 180° in a four-cylinder internal combustion engine, the second cycle cylinder stopping at the compression BDC means that the first cycle cylinder is stopped at the compression TDC. For example, by predicting that the first cycle cylinder will stop at the compression TDC, it can be predicted that the second cycle cylinder will stop at the compression BDC. Note that in the present embodiment, because an explanation has been provided about a four-cylinder internal combustion engine, the offset between the cylinders is 180° (i.e., combustion is carried out every 180°), but for example, in the case of an eight-cylinder engine, the offset between the cylinders may be 90° (i.e., combustion is carried out every 90°).

Figure 6:
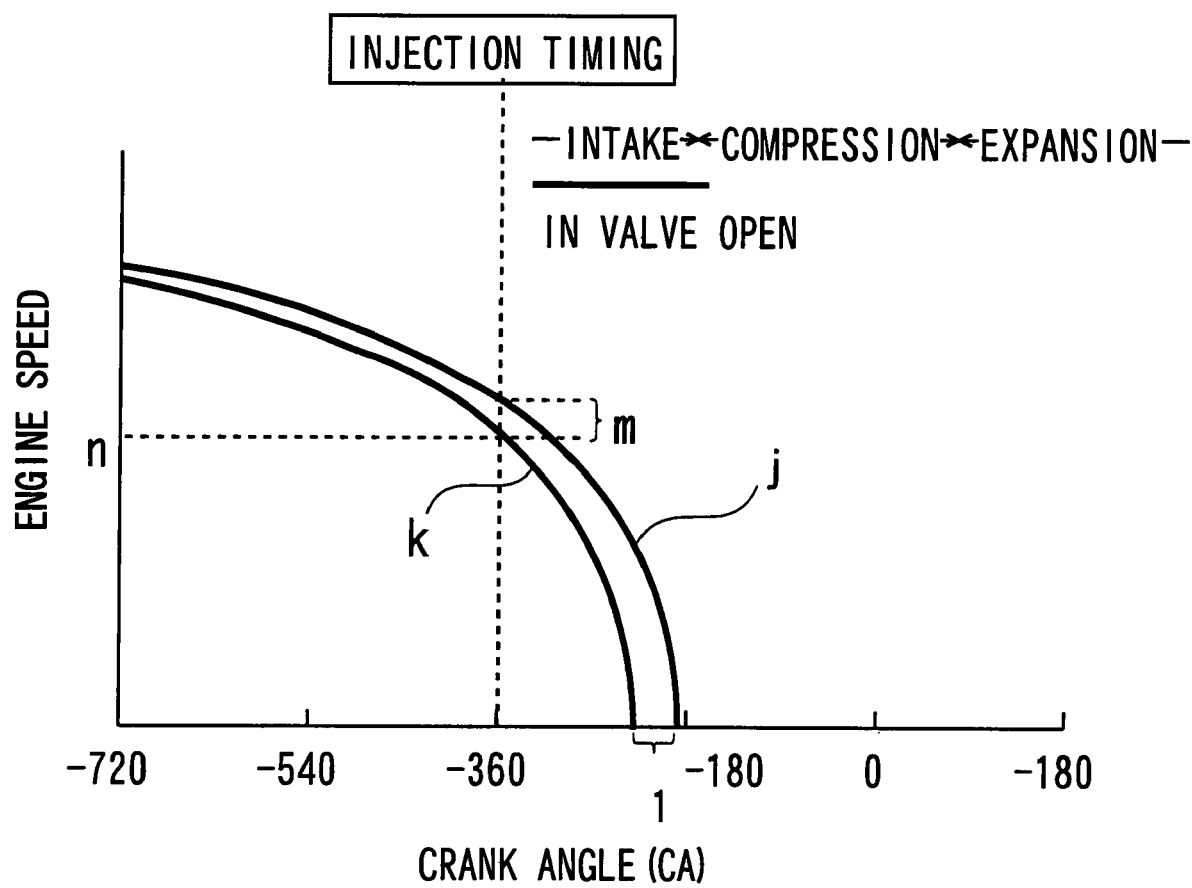
FIG. 6 is a drawing showing the relationship between the engine speed, the crank angle, and the fuel injection timing in a stopped intake-stroke cylinder in an internal combustion engine according to the present embodiment.

FIG. 6 is a drawing that, similar to FIG. 3, shows that relationship between the engine speed, the crank angle, and the fuel injection timing for a stopped intake-stroke cylinder in the internal combustion engine 1 according to the present embodiment. In FIG. 6, the curve "j" shows the relationship between the engine speed and the crank angle when the rotation of the crankshaft 13 has stopped at compression BDC.

Figure 7:
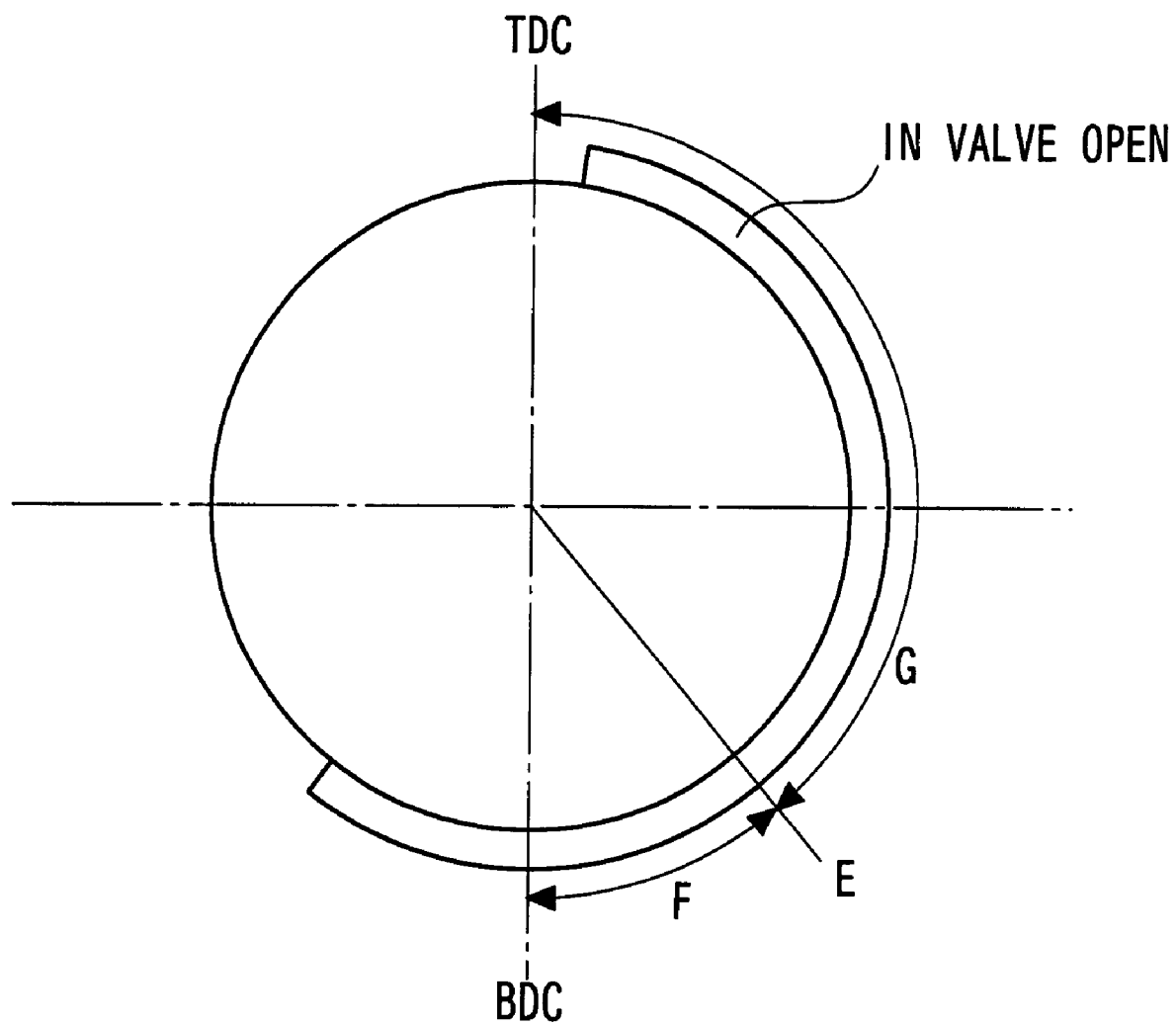
FIG. 7 is a drawing for explaining the stop position in an intake-stroke cylinder when the internal combustion engine 1 has stopped according to the present embodiment.

FIG. 7 is a drawing for explaining the stop position of the stopped intake-stroke cylinder (the second cycle cylinder) of the internal combustion engine 1 according to the present embodiment.

The injection timing of the fuel injection for the second cycle cylinder described above is based on both the position at which the crankshaft 13 is predicted to stop when the engine operation is stopped and the actual position at which the crankshaft 13 has stopped.

Specifically, as shown in FIG. 7, where a position at about 40 to 50° before compression BDC (a −220° to −230° crank angle; below, this position may also be referred to as position E) serves as the reference (a predetermined position), while the second cycle cylinder is in the intake stroke, predicting the position at which the crankshaft 13 will stop is based on predicting whether the crankshaft 13 will stop in the area F (between position E and compression BDC) on the compression BDC side of the position E, or will stop in area G (between position E and TDC of the intake stroke) on the top dead center of the intake stroke (below, this may also be referred to as intake TDC) side of the position E. In addition, in the case in which it is predicted that the crankshaft 13 will stop in the area G on the intake TDC side of the position E, then the prediction of the position at which the crankshaft 13 will stop is based on whether the position at which the crankshaft 13 has actually stopped is at the compression BDC side or at the intake TDC side of the position E (area F or area G). Note that the curve "k" that is shown in FIG. 6 corresponds to the case in which the crankshaft 13 has stopped at the position E shown in FIG. 7, and the range l of the crank angle that is shown in FIG. 6 corresponds to the area F that is shown in FIG. 7.

In the case in which the second cycle cylinder has stopped in the intake TDC side (area G) when the engine operation is stopped, as shown in FIG. 2, it is possible to seal the injected fuel in the second cycle cylinder advantageously by carrying out fuel injection D2 when the internal combustion engine 1 is in the engine start-up state (preferably at the beginning of the start-up). Note that in this manner, in the case in which the fuel injection is carried out during engine start-up, the position E is the stopping position of the second cycle cylinder that enables the injected fuel to be advantageously sealed in the second cycle cylinder.

However, in the case in which the second cycle cylinder stops in proximity to the compression BDC when the engine operation stops, the intake valve 3 closes immediately after the engine start-up. Therefore, even if fuel is injected after the engine start-up, it is possible that almost no fuel will be drawn into the cylinder, and sealing the injected fuel in the second cycle cylinder favorably will become difficult. Thus, in the case in which the second cycle cylinder has stopped in proximity to compression BDC when the engine operation is stopped, preferably the fuel is sealed before stopping.

Thus, in the case in which it is predicted that the second cycle cylinder will stop in proximity to the compression BDC, that is, in the area F shown in FIG. 7, when the engine operation is stopped, fuel injection is carried out while the internal combustion engine 1 is stopping. In this case, as shown in FIG. 2, when the internal combustion engine 1 is in the stopping state B, the fuel injection B1 into the first cycle cylinder continues, and the fuel injection B2 into the second cycle cylinder is carried out. The actuation signal for the fuel cut in FIG. 2(C) for this case is shown by the solid line.

In addition, even in the case in which it is predicted that the second cycle cylinder will stop at the intake TDC side of the position E, and not stop in proximity to the compression BDC, when the engine operation is stopped, there are cases in which the second cycle cylinder actually does not stop at the intake TDC side of the position E, but stops at the compression BDC side of the position E. In such a case, because it has been predicted that the second cycle cylinder would stop at the intake TDC side of the position E, the fuel injection is not carried out while stopping. In addition, in this state, when the fuel injection is carried out after the engine start-up, because the second cycle cylinder has actually stopped at the compression BDC side of the position E, there is the possibility that sealing the injected fuel in the second cycle cylinder advantageously will become difficult.

Thus, in the case in which it is predicted that the second cycle cylinder will stop at the intake TDC side (area G) of the position E and will not stop in proximity to the compression BDC (area F) when the engine operation is stopped and in the case in which the crank position sensor 14 has detected that the second cycle cylinder has stopped at the compression BDC side (area F) of the position E, as shown in FIG. 2, when the internal combustion engine 1 is in the stopped state C, fuel injection C2 is carried out. In this manner, by carrying out fuel injection C2 when the internal combustion engine 1 is in the stopped state C, it becomes possible to seal the injected fuel into the second cycle cylinder more favorably than in the case in which fuel is injected after the engine start-up. In the actuation signal for the fuel cut in FIG. 2(C) for this case, the portion that corresponds to the fuel injection B2 and the fuel injection C2 is shown by the broken like.

In this manner, when the engine operation is stopped, based on both the position at which the crankshaft 13 is predicted to stop and the actual position at which the crankshaft 13 has stopped, as shown in FIG. 2, the fuel injection is carried out by switching the injection timing of the second cycle cylinder (the stopped intake-stroke cylinder), which is in the intake stroke when the engine operation is stopped, between the state B, when the internal combustion engine is stopping, the stopped state C, and the engine start-up state D. Thereby, a further improvement of the start-up characteristics can be implemented.

Next, the control of the ignition timing during the start-up of the internal combustion engine 1 will be explained.

In the case in which the first cycle cylinder stops at the compression BDC side during the compression stroke, more air (fuel-air mixture) is sealed in the cylinder than when the first cycle cylinder stops at the compression TDC side. Therefore, in the case in which the first cycle cylinder stops at the compression BDC side during the compression stroke, during the subsequent engine start-up, the first (initial) ignition (first firing) is carried out while much air is in the cylinder. Thus, the generated torque at the first ignition increases rapidly, and there is the possibility that engine knock, damaging vibration, or noise may occur. In addition, in the case in which the starter motor is actuated at the beginning of the start-up of the internal combustion engine 1, damaging vibration may be produced when the difference between the cranking torque due to the starter motor and the torque generated during the first ignition that is carried out after the starter motor actuation becomes large.

Thus, in the case in which the first cycle cylinder stops at the compression BDC side during the compression stroke, the first ignition after the engine start-up (the ignition timing by the spark plug 5 in the first cycle cylinder) is delayed. Thereby, because the torque that is generated during the first ignition does not increase rapidly, it is possible to suppress the occurrence of engine knock, damaging vibrations, and noise, the start-up characteristics become favorable, the driving feel is further improved, and it is possible to suppress any deterioration in drivability.

Note that a position at about 90° before compression TDC (a −90° crank angle) is preferable as a position at which the first cycle cylinder stops. If the stopping position of the first cycle cylinder is such a position, because the first ignition is carried out comparatively early, the torque generated during the first ignition is an appropriate (desirable) amount. In such a case, the cranking torque due to the starter motor is also small, and it is possible to prevent the difference between the cranking torque due to the starter motor and the torque that is generated during the first ignition from becoming large. Thereby, because the generation of damaging vibration can be suppressed, the start-up characteristics become favorable, the driving feel is further improved, and it is possible to suppress any deterioration in the drivability. Therefore, preferably, as an amount for delaying the ignition, the delay amount becomes larger as the position at which the first cycle cylinder stops becomes closer to the compression BDC than the position that is at about 90° before compression TDC. The position at which the first cycle cylinder stops may be based on a prediction or may be detected by a crank position sensor 14 after the engine is stopped.

In addition, in the second cycle cylinder as well, similar to the case of the first cycle cylinder, the timing of the ignition (the second ignition after the engine start-up; the firing by the spark plug 5 in the second cycle cylinder) may be adjusted based on the amount of air in a cylinder. In the second cycle cylinder, the amount of air drawn due to the stopping on the compression BDC side when the engine is stopped is larger than the amount of air that is drawn from the state in which the second cycle cylinder is stopped on the intake TDC side at the time of the engine start-up. Therefore, the ignition may be delayed when the second cycle cylinder has stopped on the compression BDC side. Thereby, the torque generated during the second ignition does not increase rapidly, the start-up characteristics are more favorable, the driving feel can be further improved, and it becomes possible to suppress any deterioration in drivability.

Here, during the normal ignition control of the internal combustion engine 1, the ignition signal is turned ON at 30° before compression TDC (a −30° crank angle) and turned OFF at the compression TDC. In addition, during the compression stroke, in the case in which a cylinder that has stopped at a position that is passed 30° before compression TDC (a −30° to 0° crank angle) is actuated during the engine start-up, normally the ignition signal is not turned ON.

However, in the present embodiment, even in the case in which the first cycle cylinder has stopped between 30° before compression TDC and compression TDC, during the subsequent engine start-up, the ignition signal for the first cycle cylinder is turned ON.

Thereby, even in the case in which the first cycle cylinder has stopped in proximity to the compression TDC of the compression stroke when the engine operation is stopped, the combustion can be carried out because the first ignition signal during the engine start-up is ON, and thus it is possible to carry out combustion from the first cycle cylinder reliably, and it is possible to implement an improvement in the start-up characteristics.

Next, the fuel injection control during the engine start-up will be explained. Here, during the engine start-up, the combustion of the stopped discharge-stroke cylinder, which is in the discharge stroke when the engine operation is stopped, is carried out after the second cycle cylinder has combusted. Therefore, in the present embodiment, the stopped discharge stroke cylinder may also be called the third cycle cylinder.

At the beginning of the engine start-up, because air that is present in the intake passage 6 that is formed by an intake manifold and the like is drawn into a cylinder 2 while the engine is stopped, there is a timing during which the sensor value of the air flow meter 15 cannot be effectively used. Note that at the beginning of the engine start-up, the third cycle cylinder carries out the intake stroke that is after the cylinder (the second cycle cylinder) that is in the intake stroke while stopped.

Thus, in the present embodiment, the amount of air that has entered the cylinder that is in the intake stroke during a predetermined interval after the engine start-up is predicted.

In the second cycle cylinder, by detecting or predicting position at which the crankshaft 13 will stop when the engine is stopped, it is possible to find the amount of air that has been drawn into the second cycle cylinder based on the volume of the cylinder from the stop position to the compression BDC, the negative pressure generated in the cylinder, the volume of the intake passage 6 (specifically, the amount of air that can be drawn into the intake passage 6 and the intake port 8 from the part on which the intake metering valve 10 is installed to the cylinder 2), the amount of air that leaks out the intake metering valve 10 toward the upstream side, and the amount of air that leaks out the ISC valve 12 toward the upstream side.

In addition, during a predetermined interval after the engine start-up, the amount of air that enters the cylinder that is in the intake stoke following the third cycle cylinder can be estimated based on the negative pressure generated inside the cylinder, the volume of the intake passage 6, the number of times that the intake stroke has been carried out, the amount of air that leaks out the intake metering valve 10 toward the upstream side, the amount of air that leaks out the ISC valve 12 toward the upstream side, and the like.

Here, the negative pressure that is generated inside the cylinder may be estimated based on the engine speed, or may be estimated based on the degree of the increase in the engine speed (i.e., the increase rate of the engine speed per predetermined time interval (for example, a unit time)). In addition, a sensor that detects the negative pressure generated in a cylinder may be provided, and the negative pressure may be detected by this sensor.

In this manner, the fuel injection amount is calculated from the predicted amount of air by predicting the amount of air that will enter the cylinder that is in the intake stroke after the engine start-up.

Here, after the engine start-up, the predetermined timing during which the amount of air that has entered the cylinder that is in the intake stroke is predicted denotes an interval up to the time that the influence of the air that is present in the intake passage 6 is eliminated and the sensor value of the air flow meter 15 can be used effectively. This predetermined interval may be estimated, for example, from the engine speed, the volume of the intake passage 6 (for example, the volume of the intake manifold), the number of times that the intake stroke has been carried out, the leak-out flow rate from the intake metering valve 10, and the leak-out flow rate from the ISC valve 12.

Figure 8:
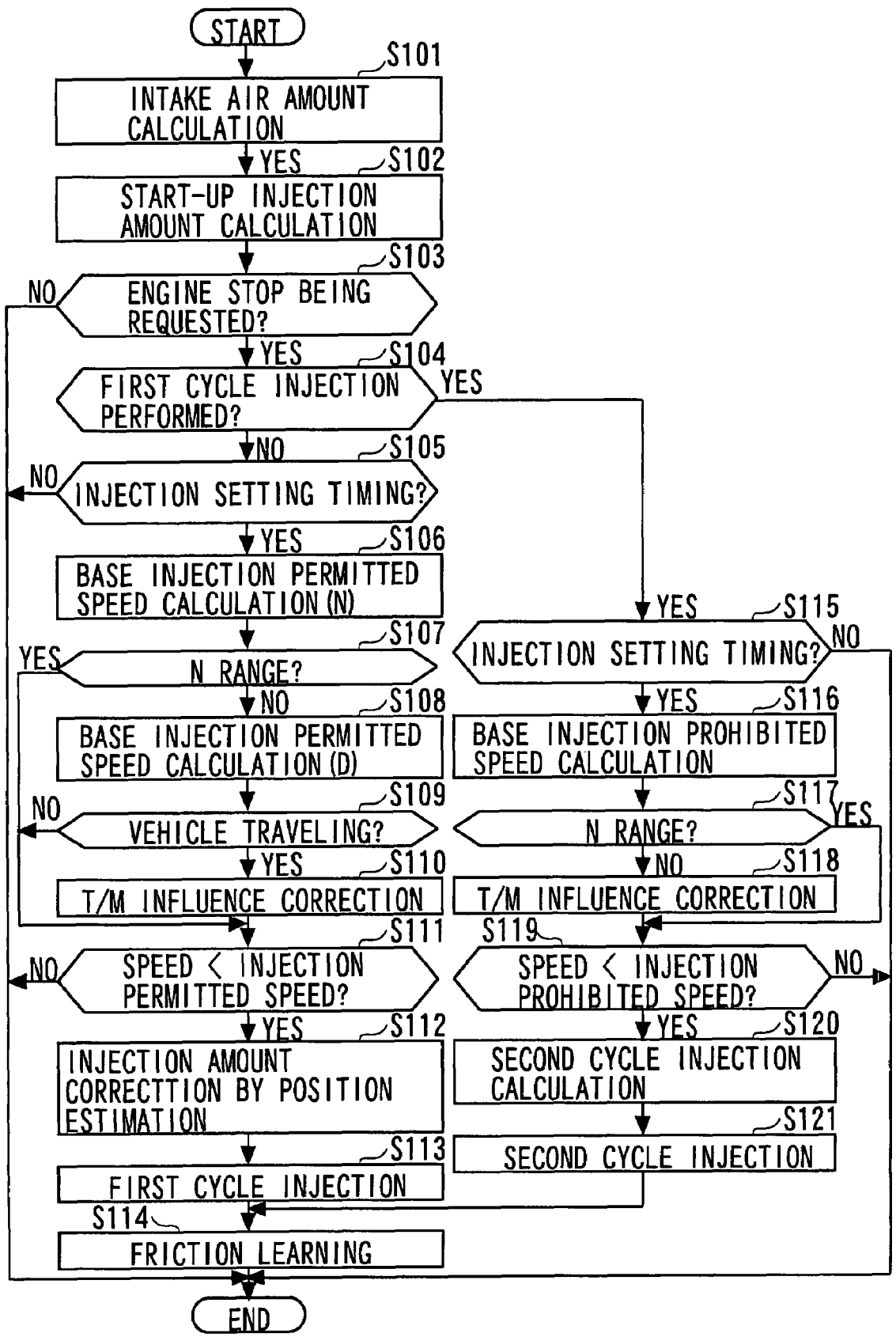
FIG. 8 is a flowchart showing the start-up control routine that is executed in the stopping state B shown in FIG. 2.

Below, a specific execution sequence (routine) that is carried out by the ECU 30 will be explained for the start-up control that is applied to the present embodiment. FIG. 8 is a flowchart showing the start-up control routine that is executed at predetermined intervals by the ECU 30 in the stopping state B shown in FIG. 2.

When the processing moves to this routine, first, in step S101, the ECU 30 calculates the intake air amount. Next, in step S102, the fuel injection amount during the engine start-up is calculated from the intake air amount that was calculated in step S101. Next, in step S103, it is determined whether there is currently an engine operation stop request for the internal combustion engine 1, that is, whether the engine operation stop conditions are satisfied. In step S103, in the case in which the result is a positive determination, the processing proceeds to step S104, and in the case of a negative determination, the routine is temporarily exited.

In step S104, it is determined whether fuel injection has been performed in the first cycle cylinder. In the case in which the result of step S104 is a positive determination, the processing proceeds to step S115, and in the case of a negative determination, the processing proceeds to step S105.

In step S105, it is determined whether the timing is the set injection timing during which the fuel injection is performed. Here, the injection timing for the first cycle cylinder is set, for example, at 90° before discharge top dead center (a −450° crank angle). In the case in which the result of step S105 is a positive determination, the processing proceeds to step S106, and in the case of a negative determination, the routine is temporarily exited.

In step S106, the base (reference) fuel injection permitted speed is calculated when the automatic transmission is in the N range. Next, in step S107, it is determined whether the automatic transmission is in the N range. In the case in which the result in step S107 is a positive determination, the processing proceeds to step S111, and in the case of a negative determination, the processing proceeds to step 108. In step S108, the base fuel injection permitted speed is calculated for the case in which the automatic transmission is in a travel range such as the D range.

Here, the base fuel injection permitted speed corresponds to the engine speed "i", which is the smallest value among the engine speeds that are in the range "f" at a crank angle "e", as was explained by with reference to FIG. 3. Therefore, it is determined whether fuel injection will be performed using this value as the determined value. In addition, this engine speed is corrected based on the shift range of the automatic transmission, as has been described above. Here, where the fuel injection permitted speed while the automatic transmission is in the N range serves as a reference, the fuel injection permitted speed for the case of the travel range may be corrected. By setting the fuel injection permitted speed in this manner, it is possible to perform a more favorable fuel injection in the first cycle cylinder, which is in the compression stroke when the engine has been stopped.

Next, in step S109, it is determined whether the vehicle is traveling. In the case in which the determination in step S109 is a positive determination, the processing proceeds to step S110, and in the case of a negative determination, the processing proceeds to step S111.

Step S10 corresponds to the case in which it is determined that the internal combustion engine 1 is stopped while the vehicle is traveling with the automatic transmission in the travel range, and in this case, the relationship between the internal combustion engine 1 and the automatic transmission is a reverse drive relationship. Therefore, in step S110, for the fuel injection permitted speed calculated in step S108, as described above, correction for the case in which the relationship between the internal combustion engine 1 and the automatic transmission is in a reversed drive relationship is carried out. Note that the fuel injection permitted speed for the case of the travel range may be corrected after determining whether the vehicle is traveling.

In step S111, the base fuel injection permitted speed that has been calculated in step S106 and S108 and the engine speed are compared, and it is determined whether the engine speed is lower than the fuel injection permitted speed. In the case in which the result in step S111 is a positive determination, the processing proceeds to step S112, and in the case of a negative determination, the routine is temporarily exited.

In step S112, the fuel injection rate is corrected by predicting the position at which the first cycle cylinder will stop. During the compression stroke, the case in which the first cycle cylinder has stopped at the compression BDC side of the compression TDC, more air is sealed. Therefore, a correction may be carried out such that the fuel injection amount will become larger as the stopping position is predicted to be more toward the compression BDC side. In step S113, the fuel injection for the first cycle cylinder is performed.

In step S115, it is determined whether the timing is the set injection timing in which the fuel injection is performed in the second cycle cylinder. The discharge top dead center (a −360° crank angle), for example, is set to the injection timing in the second cycle cylinder. In the case in which the result of the determination in step S115 is a positive determination, the processing proceeds to step S116, and in the case of a negative determination, the routine is temporarily exited.

In step S116, the base fuel injection prohibited speed is calculated. While the internal combustion engine 1 is stopping, carrying out fuel injection in the second cycle cylinder is the case in which, as described above, it is predicted that the second cycle cylinder will stop between the compression BDC and about 40 to 50° before compression BDC (a −220 to −230° crank angle). When the engine speed is too low during the timing in which the fuel injection is carried out in the second cycle cylinder, the second cycle cylinder stops at the TDC side (area G rather than area F in FIG. 7) of the intake stroke. Therefore, it is possible to perform fuel injection in the second cycle cylinder, which has stopped in the area F shown in FIG. 7, by carrying out fuel injection when the engine speed during the set fuel injection is higher than the base fuel injection prohibited speed. This is accomplished by setting the engine speed (the engine speed "n" shown in FIG. 6) when the second cycle cylinder has stopped at about 40 to 50° before compression BDC as the base fuel injection prohibited speed (the determined value).

In step S117, it is determined whether the automatic transmission is in the N range. In the case in which the result in step S117 is a positive determination, the processing proceeds to step S119, and in the case of a negative determination, the processing proceeds to step S118.

In step S118, a correction for the case in which the automatic transmission is in the travel range is carried out as described above on the base fuel injection prohibited speed that was calculated in step S116, where the automatic transmission is not in the N range, that is, is in the travel range.

In step S119, it is determined whether the engine speed is larger than the base fuel injection prohibited speed. In the case in which the result in step S119 is a positive determination, the processing proceeds to step S120, and in the case of a negative determination, the routine is temporarily exited.

In step S120, the fuel injection amount for the second cycle cylinder is calculated. Next, in step S121, the fuel injection is carried out in the second cycle cylinder.

In step S114, friction learning is carried out. Here, as described above, a correction is carried out by detecting the degree to which the engine speed has decreased while the engine is stopping, that is, the decrease rate of the engine speed.

Figure 9:
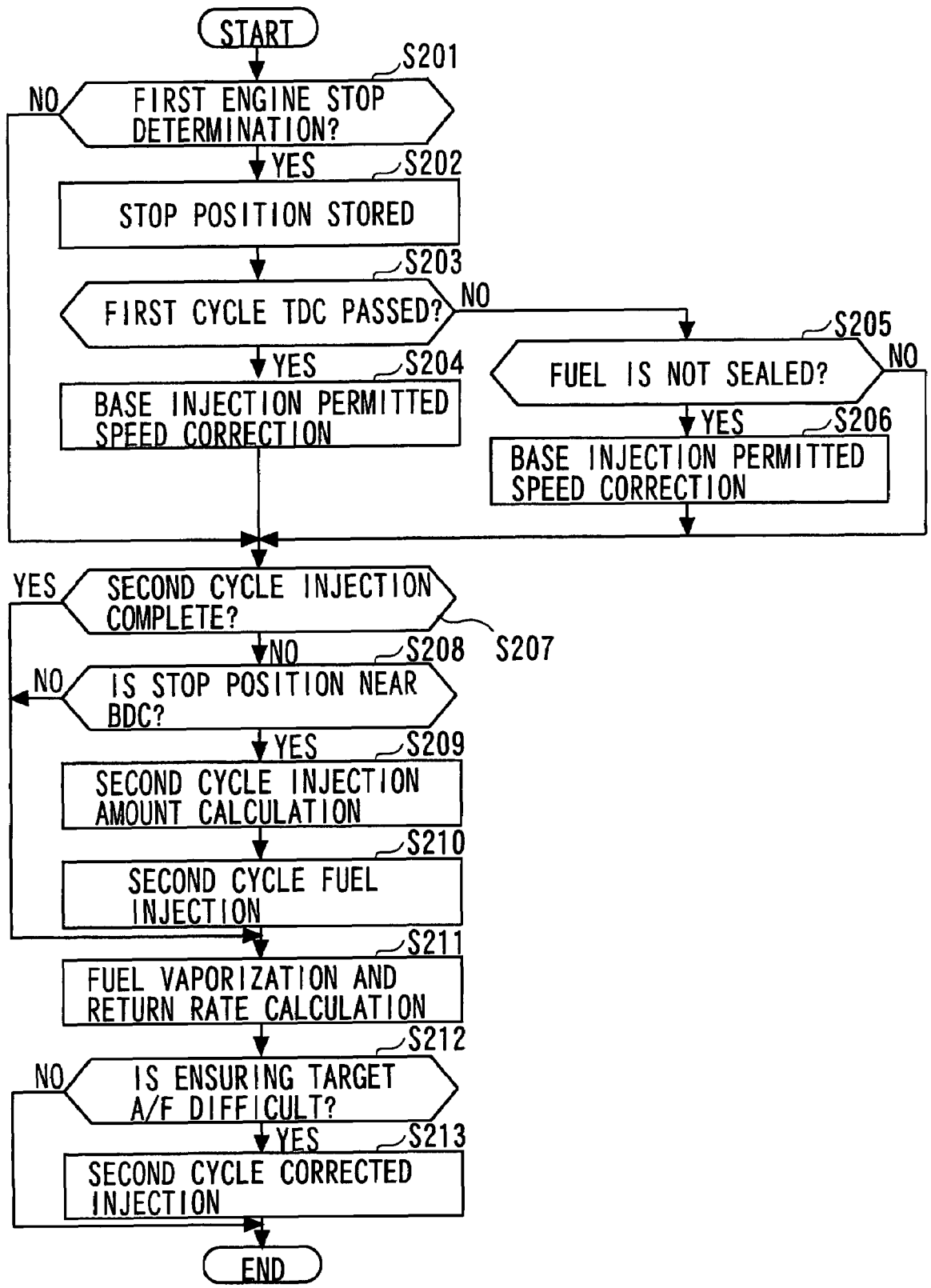
FIG. 9 is a flowchart showing the start-up control routine that is executed during the stopped state C shown in FIG. 2.

FIG. 9 is a flowchart showing the start-up control routine that is executed at predetermined time intervals by the ECU 30 in the stopped state C shown in FIG. 2.

When the processing has moved to this routine, first, in step S201, the ECU 30 determines whether this is the first engine stop determination. In the case in which the result in step S201 is a positive determination, the processing proceeds to step S202, and in the case of a negative determination, the processing proceeds to step S207. In step 202, the stop position of the crankshaft 13 is detected and stored.

Next, in step S203, it is determined whether the first cycle cylinder that was predicted to stop in the compression stroke has passed the compression TDC. In the case in which it is determined that the first cycle cylinder has passed the compression TDC, the processing proceeds to step S204, and in the case in which it is determined that the first cycle cylinder has not passed the compression TDC, the processing proceeds to step S205.

In step S205, it is determined whether fuel is sealed in the cylinder that is stopped in the compression stroke. This is in order to determine whether the internal combustion engine 1 has stopped before the cylinder in which the fuel is sealed has reached the compression stroke. In the case in which it is determined in step S205 that fuel is sealed in the cylinder, the processing proceeds to step S207, and in the case in which it is determined that fuel is not sealed, the processing proceeds to step S206. Note that the determinations of step S203 and step S205 are carried out based on the position at which the crankshaft 13 has stopped, which has been detected by the crank position sensor 14.

In step S204, a correction is carried out in which the reference value of the fuel injection permitted speed (for example, the fuel injection permitted speed calculated in step S106 in the flowchart shown in FIG. 8) is made small. In addition, in step S206, a correction is carried out in which the reference value of the fuel injection permitted speed is made large. Note that step S203 to step S206 include learning control that is performed while the internal combustion engine 1 is stopped.

In step S207, it is determined whether the fuel injection in the second cycle cylinder has completed. In the case in which the result in step S207 is a positive determination, the processing proceeds to step S211, and in the case of a negative determination, the processing proceeds to step S208. In step S208, it is determined whether the position at which the second cycle cylinder has stopped is near the compression BDC, that is, is in the area F. In the case in which the result of step S208 is a positive determination, the processing proceeds to step S209, and in the case of a negative determination, the processing proceeds to step S211.

In step S209, the fuel injection amount of the fuel that is injected into the second cycle cylinder is calculated. As described above, the fuel injection rate is calculated by estimating the intake air amount based on the position at which the crankshaft 13 has stopped. Next, in step S210, the fuel injection in the second cycle cylinder is performed.

In step S211, the fuel vaporization and return rate is calculated. In the case in which the internal combustion engine is stopped for an extended period of time, the intake valve 3 will remain open in the cylinder that is in the compression stroke when the engine is stopped, that is, the second cycle cylinder, and thus there is the possibility that the fuel sealed in the cylinder will vaporize. Thus, in step S211 to step S213, a correction by an amount equivalent to this vaporized amount is carried out in the case in which the fuel that is sealed in the cylinder has vaporized when, for example, the engine is stopped for an extended period of time. In step S211, for example, the amount that has returned from the second cycle cylinder to the intake port 8 side (the fuel vaporization and return rate) during the time that the engine has stopped may be found in advance.

Next, in step S212, it is determined in step S212 whether ensuring the target air-fuel ratio (A/F) will be difficult based on the vaporization and return rate that has been calculated in step S211. In the case in which the result in step S212 is a positive determination, the processing proceeds to step S213, and in the case of a negative determination, the routine is temporarily exited. In step S213, fuel injection of the corrected amount (additional amount) in the second cycle cylinder is carried out.

Figure 10:
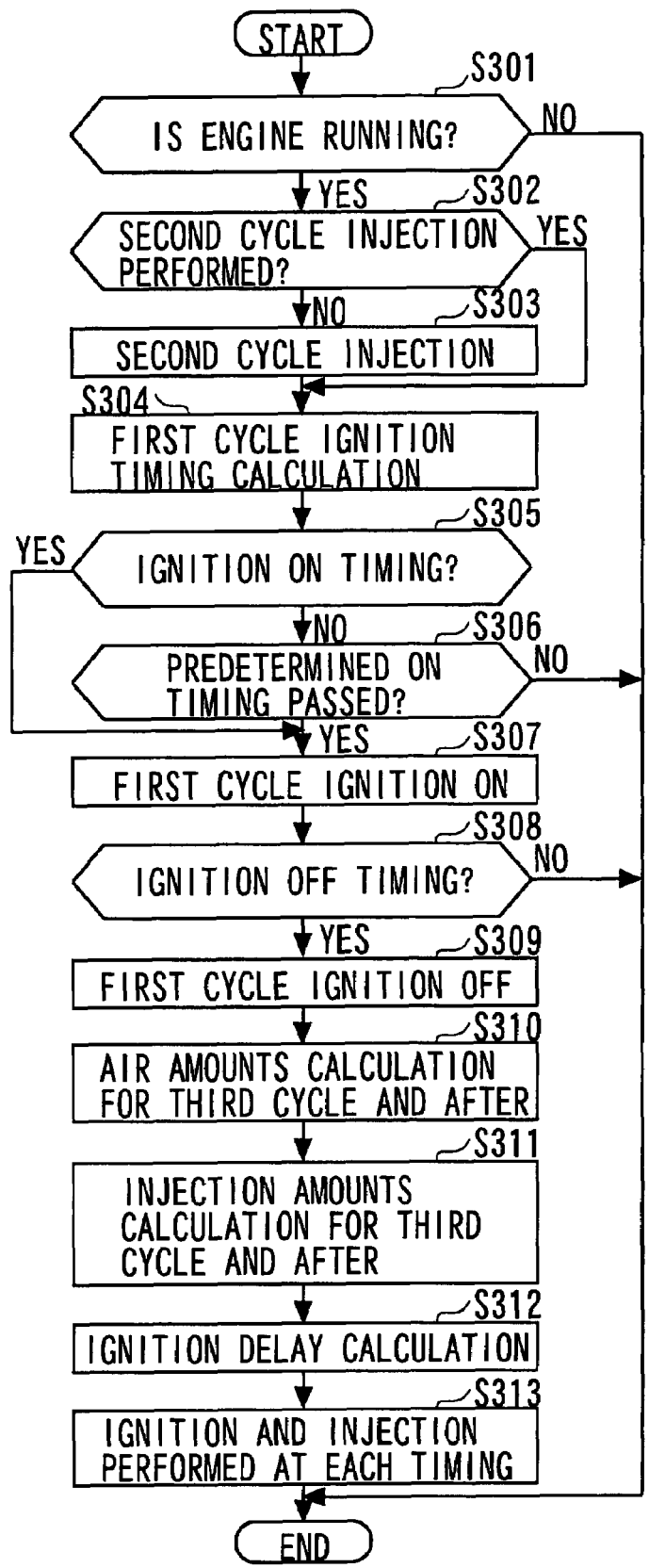
FIG. 10 is a flowchart showing the start-up control routine that is executed during the engine start-up state D shown in FIG. 2.

FIG. 10 is a flowchart showing the start-up control routine that is executed at predetermined time intervals by the ECU 30 during the engine start-up state D shown in FIG. 2.

When the processing moves to this routine, first, in step S301, the ECU 30 determines whether the internal combustion engine is running, that is, whether the crankshaft 13 is rotating. In the case in which the result of step S301 is a positive determination, the processing proceeds to step S302, and in the case of a negative determination, the routine is temporarily exited.

In step S302, it is determined whether fuel injection in the second cycle cylinder has completed. In the case in which the result of step S302 is a positive determination, the processing proceeds to step S304, and in the case of a negative determination, the processing proceeds to step S303. In addition, in step S303, the fuel injection in the second cycle cylinder is carried out.

In step S304, the ignition timing for the first cycle cylinder is calculated. The ignition timing for the first cycle cylinder is determined, as described above, based on the position at which the crankshaft 13 has stopped.

Next, in step S305, it is determined whether the timing is one during which the ignition signal (IGT) is to be turned ON. Here, it is assumed that this timing is at 30° before compression TDC (a −30° crank angle). In the case in which the result of step S305 is a positive determination, the processing proceeds to step S307, and in the case of a negative determination, the processing proceeds to step S306.

In step S306, it is determined whether a predetermined timing during which the ignition signal is ON, that is, at 30° before compression TDC, has already passed. In the case in which the result of step S306 is a positive determination, the processing proceeds to step S307, and in the case of a negative determination, the routine is temporarily exited. In step S307, the ignition signal in the first cycle cylinder is turned ON.

In step S308, it is determined whether the timing is one during which the ignition signal is to be turned OFF. In the case in which the result of S308 is a positive determination, the processing proceeds to step S309, and in the case of the negative determination, the routine is temporarily exited.

In step S309, the ignition signal for the first cycle cylinder is turned OFF. Next, in step S310, the intake air amounts for the third cycle cylinder and after are calculated. Next, in step S311, the fuel injection amounts for the third cycle cylinder and after are calculated based on the intake air amount that has been calculated in step S310.

Next, in step S312, the ignition delay amounts for the second cycle cylinder and after are calculated. In addition, in the next step S313, for each timing, the ignition of the second cycle cylinder and the fuel injection and ignition for the third cycle cylinder and after are performed.

Figure 11:
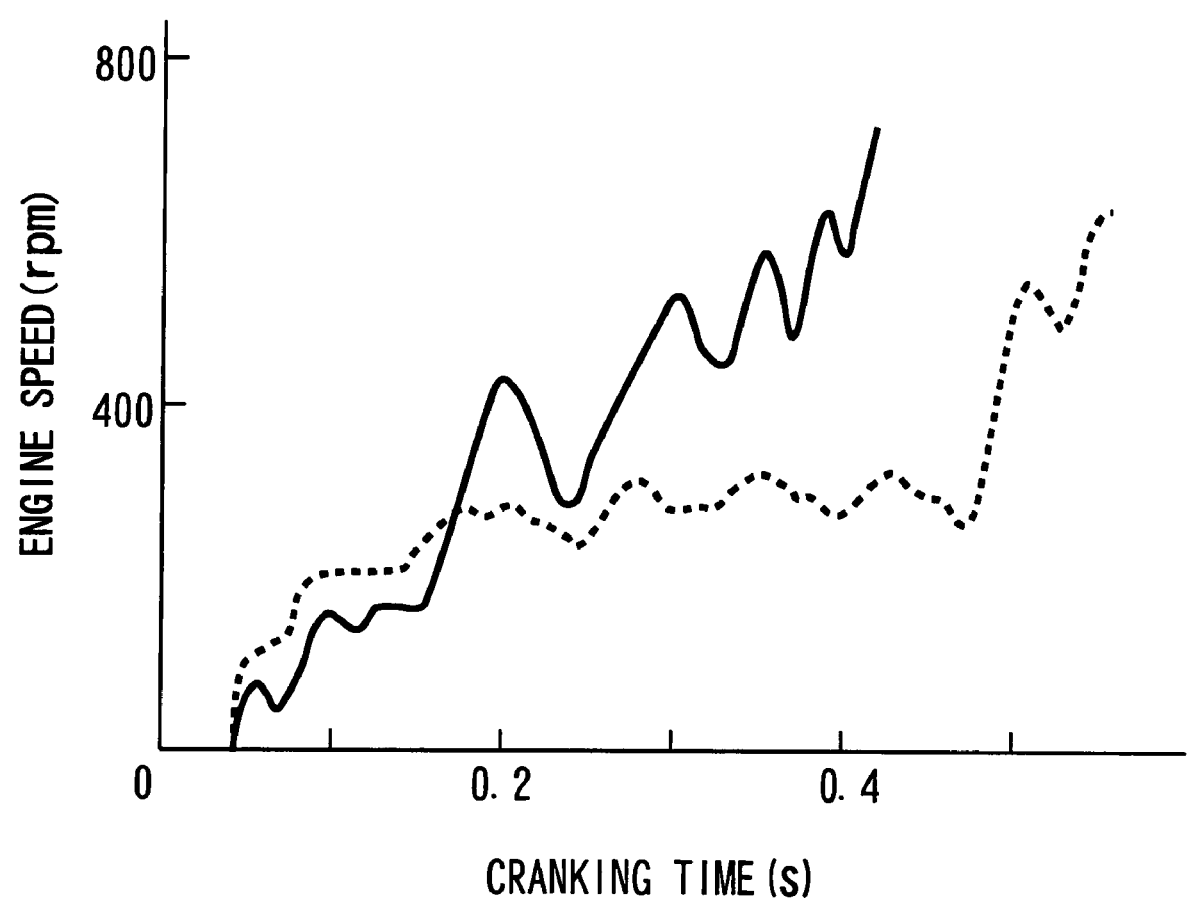
FIG. 11 is a drawing showing the relationship between the engine speed and the cranking time during the engine start-up.

FIG. 11 is a drawing that shows the relationship between the engine speed and the cranking time during the engine start-up. In FIG. 11, the engine speed while the start-up control according to the present embodiment is being performed is shown by the solid line, and the engine speed while the start-up control is being performed by a conventional method is shown by the broken line.

As shown in FIG. 11, by performing the start-up control according to the present embodiment, the start-up characteristics become more favorable, and the internal combustion engine 1 can be started up quickly and smoothly. Therefore, the driving feel during engine start-up is further improved, and it is possible to suppress deterioration of the drivability.

INDUSTRIAL APPLICABILITY

According to the present invention, it is possible to provide a technology that enables further improvement of the start-up characteristics of an internal combustion engine.

The invention claimed is:

1. A start-up control apparatus for an internal combustion engine, comprising:
   operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;
   predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;
   fuel injection control means that re-actuates said fuel injection valve of said stopped compression-stroke cylinder that is predicted by said predicting means immediately before the rotation of said engine output shaft stops; and
   start-up control means that actuates said spark plug of said stopped compression-stroke cylinder that is predicted by said predicting means when the start-up conditions for said internal combustion engine are satisfied;
   correcting means that corrects a position at which said predicting means predicts that said engine output shaft stops, based on a position at which said engine output shaft stops or a state of the rotation of said engine output shaft immediately before said engine output shaft stops;
   stop position detecting means that detects the position at which the rotation of said engine output shaft stops; and
   fuel injection amount calculating means that predicts, during a predetermined time interval after the engine start-up, an amount of intake air that is drawn into said cylinder based on the engine speed, the position at which said engine output shaft stops, volume in the intake passage, and the number of times that the intake stroke has been carried out, and calculates a fuel injection amount for said cylinder based on the predicted amount of air, wherein said fuel injection control means re-actuates said fuel injection valve of the stopped intake-stroke cylinder that is predicted by said predicting means to be in the intake stroke based on the position at which said engine output shaft stops, and switches an actuation timing of said fuel injection valve based on the position at which said predicting means predicts that said engine output shaft stops, and
   said start-up control means switches an ignition timing at which said spark plug is actuated based on the position at which said stop position detecting means detects that said engine output shaft stops.

2. A start-up control apparatus for an internal combustion engine, comprising:
   operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;
   predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;
   fuel injection control means that re-actuates said fuel injection valve of said stopped compression-stroke cylinder that is predicted by said predicting means immediately before the rotation of said engine output shaft stops; and
   start-up control means that actuates said spark plug of said stopped compression-stroke cylinder that is predicted by said predicting means when the start-up conditions for said internal combustion engine are satisfied;
   stop position detecting means that detects a stop position when the rotation of said engine output shaft stops;
   position deviation calculating means that calculates the deviation between a position at which said stop position detecting means detects that said engine output shaft stops and a position at which said predicting means has predicts that said engine output shaft stops; and
   correcting means that corrects the stop position that is predicted by said predicting means based on an amount of the deviation in a case in which the amount of deviation calculated by said position deviation calculating means is equal to or greater than a predetermined value.

3. A start-up control apparatus for an internal combustion engine, comprising:
   operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;
   predicting means that predicts a position at which rotation of an engine output shaft of said internal combustion engine stops based on the engine speed that decreases due to the actuation of said fuel injection valve and said spark plug being stopped, and predicts a stopped compression-stroke cylinder, which is in a compression stroke when the operation of said internal combustion engine stops based on said position,
   wherein said predicting means predicts the engine speed decrease rate of the engine speed per a predetermined time interval after said operation stopping means stops the actuation of said fuel injection valve and said spark plug;
   fuel injection control means that re-actuates said fuel injection valve of said stopped compression-stroke cylinder that is predicted by said predicting means immediately before the rotation of said engine output shaft stops;
   start-up control means that actuates said spark plug of said stopped compression-stroke cylinder that is predicted by said predicting means when the start-up conditions for said internal combustion engine are satisfied; and
   correcting means that corrects the engine speed decrease rate that is predicted by said predicting means based on an amount of deviation in a case in which the engine speed decrease rate that is calculated by said predicting means deviates from a reference decrease rate.

4. A start-up control apparatus for an internal combustion engine, comprising:
   operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;

predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;

fuel injection control means that re-actuates said fuel injection valve of said stopped compression-stroke cylinder that is predicted by said predicting means immediately before the rotation of said engine output shaft stops;

start-up control means that actuates said spark plug of said stopped compression-stroke cylinder that is predicted by said predicting means when the start-up conditions for said internal combustion engine are satisfied; and correcting means that corrects the stop position that is predicted by said predicting means based on a shift speed of an automatic transmission.

5. A start-up control apparatus for an internal combustion engine, comprising:

operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;

predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;

fuel injection control means that re-actuates said fuel injection valve of said stopped compression-stroke cylinder that is predicted by said predicting means immediately before the rotation of said engine output shaft stops;

start-up control means that actuates said spark plug of said stopped compression-stroke cylinder that is predicted by said predicting means when the start-up conditions for said internal combustion engine are satisfied; and correcting means that corrects the stopping position that is predicted by said predicting means in a case in which said operation stopping means stops the actuation of said fuel injection valve and said spark plug when the operation stopping conditions during vehicle travel are satisfied and the automatic transmission is in a travel range.

6. A start-up control apparatus for an internal combustion engine, comprising:

operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;

predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;

fuel injection control means that re-actuates said fuel injection valve of said stopped compression-stroke cylinder that is predicted by said predicting means immediately before the rotation of said engine output shaft stops; and start-up control means that actuates said spark plug of said stopped compression-stroke cylinder that is predicted by said predicting means when the start-up conditions for said internal combustion engine are satisfied, wherein said predicting means further predicts a stopped intake-stroke cylinder, which is in a intake stroke, from the position at which said engine output shaft is predicted to stop, said fuel injection control means further re-actuates said fuel injection valve of said stopped intake-stroke cylinder that is predicted by said predicting means, and switches an actuation timing of said fuel injection valve based on a position at which said predicting means predicts that said engine output shaft stops, and said start-up control means further actuates said spark plug of said stopped intake-stroke cylinder that is predicted by said predicting means.

7. The start-up control apparatus for an internal combustion engine according to claim 6, further comprising:

stop position detecting means that detects the position at which the rotation of said engine output shaft stops, wherein said fuel injection control means actuates said fuel injection valve immediately before the rotation of said engine output shaft stops in a case in which said predicting means predicts that the position at which said engine output shaft stops is a position at which a stopping position of a piston of said stopped intake-stroke cylinder is in proximity to bottom dead center;

actuates said fuel injection valves during the engine start-up in a case in which said predicting means predicts that the position at which said engine output shaft stops is not a position at which the stopping position of said piston of the stopped intake-stroke cylinder is in proximity to bottom dead center; and actuates said fuel injection valve when the rotation of said engine output shaft stops, in a case in which said predicting means predicts that the position at which said engine output shaft stops is such a position that the stopping position of said piston of said stopped intake-stroke cylinder is not in proximity of bottom dead center, but said stop position detecting means detects that the stopping position of said engine output shaft is such a position that the stopping position of said piston of said stopped intake-stroke cylinder is in proximity of bottom dead center.

8. The start-up control apparatus for an internal combustion engine according to claim 7, wherein said fuel injection control means further actuates said fuel injection valve in a case in which a time interval during which the rotation of said engine output shaft stops exceeds a predetermined time interval immediately before the rotation of said engine output shaft stops or after actuating said fuel injection valve when the rotation of said engine output shaft stops.

9. A start-up control apparatus for an internal combustion engine, comprising:

operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;

predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when the operation of said internal combustion engine is stopped;

fuel injection control means that re-actuates said fuel injection valve of said stopped compression-stroke cylinder that is predicted by said predicting means immediately before the rotation of said engine output shaft stops;

start-up control means that actuates said spark plug of said stopped compression-stroke cylinder that is predicted by said predicting means when the start-up conditions for said internal combustion engine are satisfied; and stop position detecting means that detects the position at which the rotation of said engine output shaft stops, wherein said start-up control means switches an ignition timing at which said spark plug is actuated based on the position at which said stop position detecting means detects that said engine output shaft stops.

10. A start-up control apparatus for an internal combustion engine, comprising:

operation stopping means that stops actuation of a fuel injection valve that injects fuel into an intake passage of said internal combustion engine and actuation of a spark plug that ignites in a cylinder of said internal combustion engine when operation stop conditions for said internal combustion engine are satisfied;

predicting means that predicts a position at which rotation of an engine output shaft of said internal combustion engine stops due to the actuation of said fuel injection valve and said spark plug being stopped, and predicts based on said position, a stopped compression-stroke cylinder, which is in a compression stroke when operation of said internal combustion engine is stopped;

fuel injection control means that re-actuates said fuel injection valve of said stopped compression-stroke cylinder that is predicted by said predicting means immediately before the rotation of said engine output shaft stops;

start-up control means that actuates said spark plug of said stopped compression-stroke cylinder that is predicted by said predicting means when the start-up conditions for said internal combustion engine are satisfied; and fuel injection amount calculating means that predicts, during a predetermined time interval after engine start-up, an amount of air that is drawn into said cylinder based on the engine speed, the position at which said engine output shaft stops, the volume inside the intake passage, and the number of times that the intake stroke has been carried out, and calculates the fuel injection amount for said cylinder based on the predicted amount of air.

* * * * *